United States Patent
Itabashi et al.

(10) Patent No.: US 10,748,519 B2
(45) Date of Patent: Aug. 18, 2020

(54) SIGNAL PROCESSING APPARATUS, METHOD, AND PROGRAM

(71) Applicant: Sony Corporation, Tokyo (JP)

(72) Inventors: Tetsunori Itabashi, Kanagawa (JP);
Kohei Asada, Kanagawa (JP);
Shigetoshi Hayashi, Tokyo (JP);
Kenichi Makino, Kanagawa (JP);
Kazuma Yoshii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/340,764

(22) PCT Filed: Jul. 26, 2017

(86) PCT No.: PCT/JP2017/027075
§ 371 (c)(1),
(2) Date: Apr. 10, 2019

(87) PCT Pub. No.: WO2018/074025
PCT Pub. Date: Apr. 26, 2018

(65) Prior Publication Data
US 2020/0043459 A1    Feb. 6, 2020

(30) Foreign Application Priority Data
Oct. 17, 2016 (JP) .................... 2016-203429

(51) Int. Cl.
*G10K 11/178* (2006.01)
*G10L 21/0208* (2013.01)
(Continued)

(52) U.S. Cl.
CPC ........ *G10K 11/178* (2013.01); *G10L 21/0208* (2013.01); *H04R 1/1083* (2013.01);
(Continued)

(58) Field of Classification Search
None
See application file for complete search history.

(56) References Cited

U.S. PATENT DOCUMENTS

| 5,325,437 A | 6/1994 | Doi et al. |
| 2008/0240457 A1 | 10/2008 | Inoue et al. |

(Continued)

FOREIGN PATENT DOCUMENTS

| JP | 07-30347 A | 1/1995 |
| JP | 2008-116782 A | 5/2008 |

(Continued)

OTHER PUBLICATIONS

Extended European Search Report dated Oct. 25, 2019 in connection with European Application No. 17861551.4.
(Continued)

*Primary Examiner* — Qin Zhu
(74) *Attorney, Agent, or Firm* — Wolf, Greenfield & Sacks, P.C.

(57) ABSTRACT

A signal processing apparatus includes a signal processor configured to: generate a first noise reduction signal using an adaptive filter based on a signal output from a first input apparatus, and cause the generated first noise reduction signal to be output by a first output apparatus; and generate a second noise reduction signal using a feedback filter based on a signal output from a second input apparatus, and cause the generated second noise reduction signal to be output by a second output apparatus. The feedback filter has a fixed feedback coefficient. The first input apparatus is located at a first noise-cancellation target location in an environment, and the second input apparatus is located at a second noise-cancellation target location in the environment, which may be different from the first noise-cancellation target location.

14 Claims, 14 Drawing Sheets

(51) Int. Cl.
*H04R 1/10* (2006.01)
*B60R 11/02* (2006.01)
*B60R 16/02* (2006.01)

(52) U.S. Cl.
CPC ............... *G10K 2210/1081* (2013.01); *G10K 2210/3028* (2013.01); *G10K 2210/511* (2013.01); *G10K 2210/512* (2013.01)

(56) References Cited

U.S. PATENT DOCUMENTS

| | | | | |
|---|---|---|---|---|
| 2008/0317254 | A1* | 12/2008 | Kano | G10K 11/178 381/71.4 |
| 2011/0222698 | A1* | 9/2011 | Asao | G10K 11/17825 381/71.1 |
| 2013/0208906 | A1* | 8/2013 | Asao | G10K 11/178 381/71.4 |
| 2016/0093283 | A1 | 3/2016 | Kano | |
| 2016/0225364 | A1* | 8/2016 | Ganeshkumar | G10K 11/178 |
| 2016/0284337 | A1* | 9/2016 | Inoue | G10K 11/17883 |

FOREIGN PATENT DOCUMENTS

| | | |
|---|---|---|
| JP | 2008-247342 A | 10/2008 |
| JP | 3180273 U | 11/2012 |

OTHER PUBLICATIONS

Written Opinion and English translation thereof dated Oct. 24, 2017 in connection with International Application No. PCT/JP2017/027075.

International Preliminary Report on Patentability and English translation thereof dated May 2, 2019 in connection with International Application No. PCT/JP2017/027075.

International Search Report and English translation thereof dated Oct. 24, 2017 in connection with International Application No. PCT/JP2017/027075.

* cited by examiner

SIGNAL PROCESSING APPARATUS, METHOD, AND PROGRAM

CROSS-REFERENCES TO RELATED APPLICATIONS

This application is a U.S. National Stage entry under 35 U.S.C. § 371 of International Application No. PCT/JP2017/027075, filed in the Japan Patent Office on Jul. 26, 2017, which claims priority to Japanese Patent Application No. 2016-203429, filed in the Japan Patent Office on Oct. 17, 2016, each of which is incorporated by reference herein in its entirety.

TECHNICAL FIELD

The present disclosure relates to a signal processing apparatus, a method, and a program.

BACKGROUND ART

In recent years, a noise cancelling (noise reduction) technology has been widely developed. The noise reduction technology is broadly divided into two methods including a Feedforward (FF) method and a Feedback (FB) method. In many cases, these methods are appropriately used in accordance with a targeted noise.

On the other hand, there exists an idea of combining these noise reduction technologies. For example, Patent Literature 1 described below discloses a technology of enhancing a noise reduction effect in headphones by combining the FF method and the FB method.

CITATION LIST

Patent Literature

Patent Literature 1: JP 2008-116782A

DISCLOSURE OF INVENTION

Technical Problem

Nevertheless, in the combination of the FF method and the FB method as disclosed in Patent Literature 1 described above, a noise reduction effect sometimes becomes limitative. For example, as for a noise containing a component varying in characteristic, a noise reduction effect can be limitative.

In view of the foregoing, the present disclosure proposes a structure that can effectively reduce a noise containing a component varying in characteristic.

Solution to Problem

According to the present disclosure, there is provided a signal processing apparatus including a signal processing section configured to generate a first noise reduction signal using an adaptive filter on the basis of a signal output from a first input apparatus, and cause the generated first noise reduction signal to be output by a first output apparatus, and generate a second noise reduction signal using a fixed filter on the basis of a signal output from a second input apparatus, and cause the generated second noise reduction signal to be output by a second output apparatus.

Moreover, according to the present disclosure, there is provided a method executed by a processor, the method including generating a first noise reduction signal using an adaptive filter on the basis of a signal output from a first input apparatus, and causing the generated first noise reduction signal to be output by a first output apparatus; and generating a second noise reduction signal using a fixed filter on the basis of a signal output from a second input apparatus, and causing the generated second noise reduction signal to be output by a second output apparatus.

Moreover, according to the present disclosure, there is provided a recording medium having a program recorded thereon, the program causing a computer to function as: a signal processing section configured to generate a first noise reduction signal using an adaptive filter on the basis of a signal output from a first input apparatus, and cause the generated first noise reduction signal to be output by a first output apparatus, and generate a second noise reduction signal using a fixed filter on the basis of a signal output from a second input apparatus, and cause the generated second noise reduction signal to be output by a second output apparatus.

Advantageous Effects of Invention

As described above, according to the present disclosure, a structure that can effectively reduce a noise containing a component varying in characteristic is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
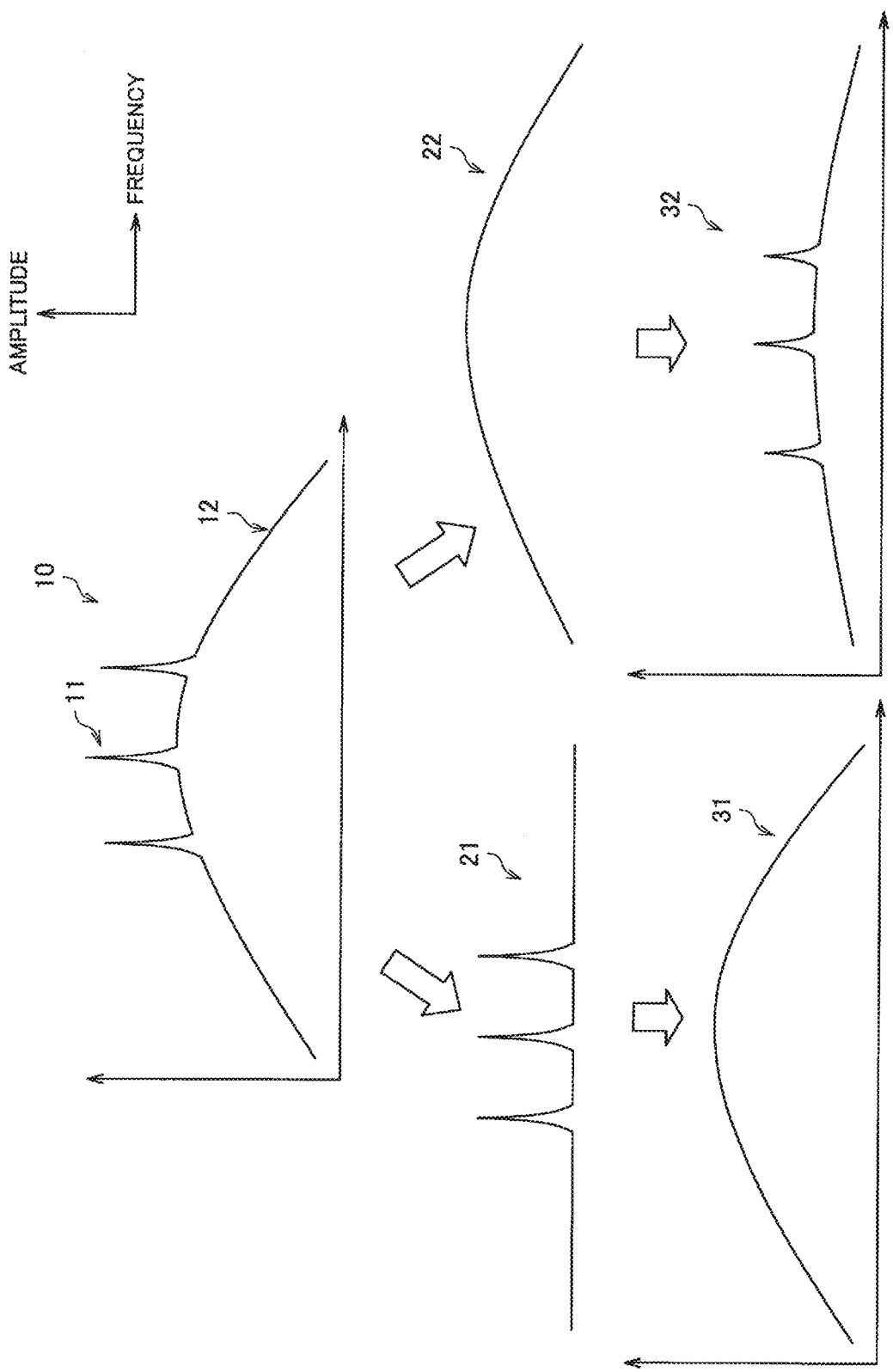
FIG. 1 is a diagram for describing a noise targeted by a noise cancelling system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Overview
2. Basic Configuration Example
2.1. Internal Configuration Example
2.2. Noise Reduction Processing of AFF Method
2.3. Noise Reduction Processing of FB Method
3. Variations of Configuration
3.1. First Arrangement
3.2. Second Arrangement
3.3. Third Arrangement
3.4. Fourth Arrangement
3.5. Fifth Arrangement
3.6. Sixth Arrangement
3.7. Switching of Arrangement
4. Hardware Configuration Example
5. Conclusion

1. OVERVIEW

A signal processing apparatus (hereinafter, also referred to as a noise cancelling system (i.e. noise reduction system)) according to an embodiment of the present disclosure can be implemented in various forms. Hereinafter, as an example, a case where the noise cancelling system is implemented as an in-vehicle type will be described. First of all, a noise targeted by an in-vehicle noise cancelling system will be described with reference to FIG. 1.

FIG. 1 is a diagram for describing a noise targeted by the noise cancelling system according to the present embodiment. In each graph in FIG. 1, a horizontal axis indicates frequency and a vertical axis indicates amplitude. A noise 10 of a running vehicle has a noise characteristic including a first noise 11 with a narrow frequency bandwidth and a second noise 12 with a wide frequency bandwidth. The first noise 11 is a peaky noise emerging at a frequency of constant number times of the number of revolutions of an internal combustion engine (i.e. engine), for example. The second noise 12 is a broad noise including a road noise, a wind noise, and the like, for example. For example, the frequency bandwidth of the first noise 11 may have a range of about ±5% with respect to a center frequency. In addition, the frequency bandwidth of the second noise 12 may be about 50 Hz to 300 Hz in consideration of a range that the noise cancelling system can actually reduce (i.e. cancel). It should be appreciated that these values of the targeted noise can vary in accordance with the design/mounting of the noise cancelling system.

The first noise 11 varies in frequency in accordance with a variation in the number of revolutions of the engine. Thus, for reducing the first noise 11, application of noise reduction processing of not a simple FF method but an Adaptive Feedforward (AFF) method is desirable. For example, a noise 31 obtainable after noise reduction processing of the AFF method that uses a filter having a first characteristic 21 is applied is a noise obtained by reducing the first noise 11 from the noise 10. Even in a case where the frequency of the first noise 11 varies in accordance with a variation in the number of revolutions of the engine, or the like, the noise reduction processing of the AFF method can continuously reduce the first noise 11 by causing a characteristic of the filter to follow the variation. Nevertheless, a component of the second noise 12 still remains in the noise 31. At the time of vehicle running, influences of not only an engine noise but also a road noise, a wind noise, and the like are large. Thus, the application of only the noise reduction processing of the AFF method is insufficient.

On the other hand, for reducing the second noise 12, application of the noise reduction processing of the FB method is desirable. The noise reduction processing of the FB method can uniformly reduce various noises by a certain degree of amount. Nevertheless, a noise biased toward a pinpointed frequency, such as an engine noise, remains outstanding without being sufficiently reduced. For example, a noise 32 obtainable after the noise reduction processing of the FB method that uses a filter having a second characteristic 22 is applied is a noise obtained by reducing the second noise 12 from the noise 10. Nevertheless, a component of the first noise 11 still remains in the noise 32. Thus, the application of only the noise reduction processing of the FB method is insufficient.

Figure 2:
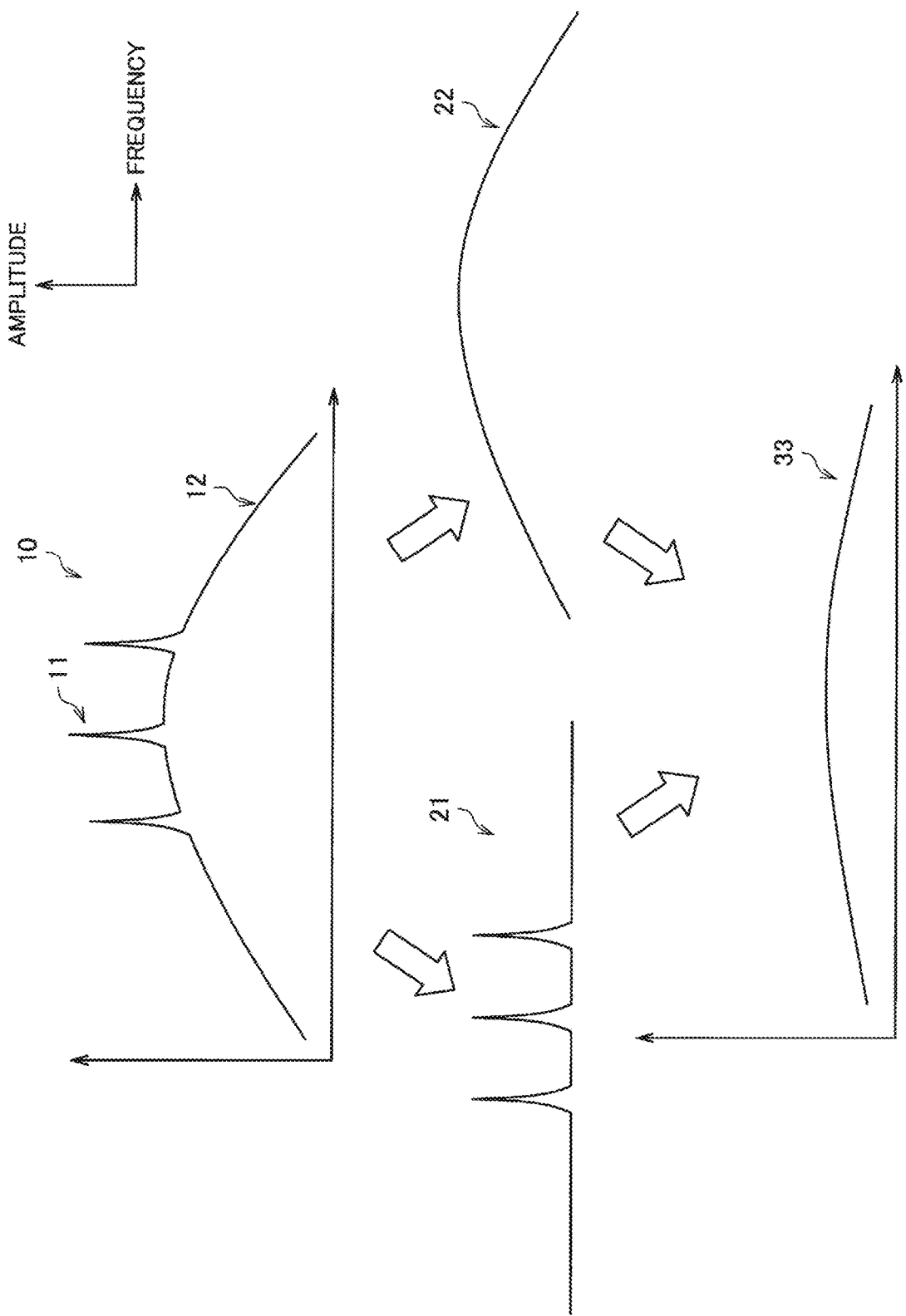
FIG. 2 is a diagram for describing an effect caused by the noise cancelling system according to the present embodiment.

In view of the foregoing, in the present embodiment, a noise cancelling system that uses the noise reduction processing of the AFF method and the noise reduction processing of the FB method in combination is proposed. FIG. 2 is a diagram for describing an effect caused by the noise cancelling system according to the present embodiment. In each graph in FIG. 2, a horizontal axis indicates frequency, a vertical axis indicates amplitude, and the noise 10, the first characteristic 21, and the second characteristic 22 are as described above with reference to FIG. 1. As illustrated in FIG. 2, a noise 33 obtainable after filter reduction processing of the AFF method that uses a filter having the first characteristic 21 and filter reduction processing of the FB method that uses a filter having the second characteristic 22 are applied is a noise obtained by reducing both of the first noise 11 and the second noise 12 from the targeted noise 10.

2. BASIC CONFIGURATION EXAMPLE

Hereinafter, a basic configuration example of the noise cancelling system according to the present embodiment will be described with reference to FIGS. 3 to 7.

<2.1. Internal Configuration Example>

Figure 3:
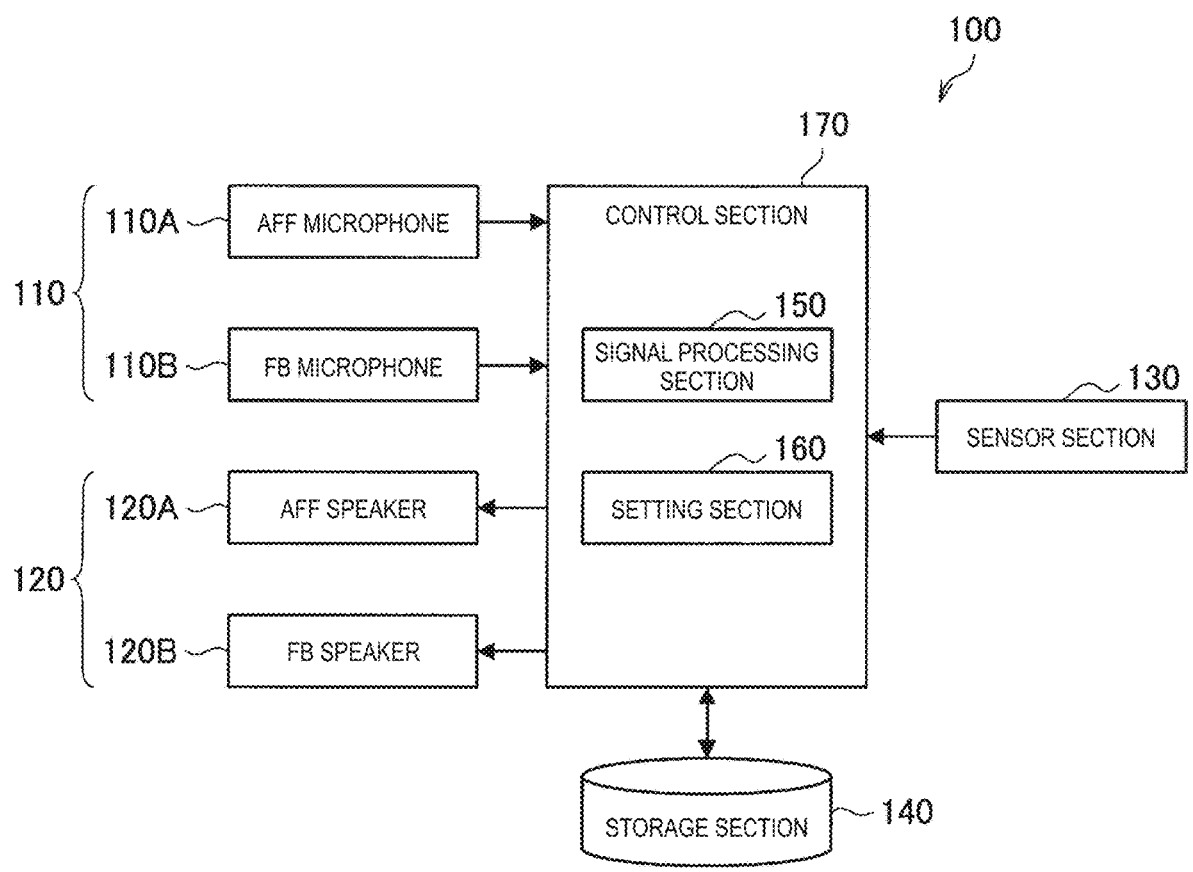
FIG. 3 is a block diagram illustrating an example of an internal configuration of the noise cancelling system according to the present embodiment.

FIG. 3 is a block diagram illustrating an example of an internal configuration of the noise cancelling system according to the present embodiment. As illustrated in FIG. 3, a noise cancelling system 100 according to the present embodiment includes a microphone 110, a speaker 120, a sensor section 130, a storage section 140, and a control section 170. Note that the structural elements are connected via an in-vehicle network such as a controller area network (CAN).

(1) Microphone 110

The microphone 110 is an input apparatus that collects (i.e. inputs) an ambient sound. The microphone 110 outputs a signal indicating a sound collection result, to the control section 170. The microphone 110 may include a microphone amplifier that amplifies a collected signal. In addition, the microphone 110 may output an analog signal, or may include an analog digital converter (ADC) and output a digital signal converted from an analog signal.

As illustrated in FIG. 3, the microphone 110 includes an AFF microphone 110A and a FB microphone 110B. The AFF microphone 110A is a first input apparatus that performs sound collection at least for the noise reduction processing of the AFF method. The FB microphone 110B is a second input apparatus that performs sound collection at least for the noise reduction processing of the FB method.

(2) Speaker 120

The speaker 120 is an output apparatus that outputs (i.e. reproduces) a sound to the periphery. The speaker 120 outputs a sound on the basis of a signal output from the control section 170. The speaker 120 may include an amplifier that amplifies a signal. In addition, the speaker 120 may include a digital analog converter (DAC) and output a sound on the basis of an analog signal converted from a digital signal.

As illustrated in FIG. 3, the speaker 120 includes an AFF speaker 120A and a FB speaker 120B. The AFF speaker 120A is a first output apparatus that performs an output for the AFF method. The FB speaker 120B is a second output apparatus that performs an output for the FB method.

(3) Sensor Section 130

The sensor section 130 has a function of detecting various types of information. The sensor section 130 according to the present embodiment performs sensing for obtaining a reference signal for the noise reduction processing of the AFF method. For example, the sensor section 130 can be implemented as a tachometer for detecting the number of revolutions of the engine, or a microphone for collecting an engine noise.

(4) Storage Section 140

The storage section 140 has a function of temporarily or permanently storing information for an operation of the noise cancelling system 100.

(5) Control Section 170

The control section 170 has a function of controlling an overall operation of the noise cancelling system 100. As illustrated in FIG. 3, the control section 170 includes a signal processing section 150 and a setting section 160.

The signal processing section 150 has a function of applying various types of signal processing to an input signal and outputting the resultant signal. The setting section 160 has a function of setting an operation mode of the signal processing section 150.

Hereinafter, the signal processing section 150 will be described in detail. The signal processing section 150 according to the present embodiment uses the noise reduction processing of the AFF method and the noise reduction processing of the FB method in combination. Specifically, the signal processing section 150 generates a first noise reduction signal using an adaptive filter on the basis of a signal output from the AFF microphone 110A. Then, the signal processing section 150 causes the generated first noise reduction signal to be output by the AFF speaker 120A. In addition, the signal processing section 150 generates a second noise reduction signal using a fixed filter on the basis of a signal output from the FB microphone 110B. Then, the signal processing section 150 causes the generated second noise reduction signal to be output by the FB speaker 120B. In this manner, because the signal processing section 150 uses, in combination, the noise reduction processing of two methods different in characteristic, it becomes possible to reduce both noises targeted by the respective methods. Note that the adaptive filter is a filter for which a filter coefficient is sequentially generated. In addition, the fixed filter is a filter for which a filter coefficient is set in a fixed manner.

The first noise reduction signal targets a noise with a narrow frequency bandwidth, and the second noise reduction signal targets a noise with a wide frequency bandwidth. In other words, the first noise reduction signal targets a noise with a narrower frequency bandwidth as compared with the second noise reduction signal. In the example illustrated in FIG. 1, the first noise reduction signal targets the first noise 11 and the second noise reduction signal targets the second noise 12.

Specifically speaking about a noise to be targeted, the first noise reduction signal may target a noise corresponding to the number of revolutions of a power source that performs a revolving motion, and the second noise reduction signal may target a noise corresponding to a movement performed by a movable object using the power source. In the case of an in-vehicle type, the power source is an internal combustion engine or a motor, the movable object is a vehicle, and the noise corresponding to a movement includes a road noise, a wind noise, and the like, for example. The signal processing section 150 uses, in combination, the noise reduction processing of the AFF method that excels at reduction of a variable peaky noise such as an engine noise, and the noise reduction processing of the FB method that excels at reduction of a broad noise such as a road noise and a wind noise. It thereby becomes possible for the noise cancelling system 100 to reduce more noises in a wide bandwidth at the time of actual running of the vehicle.

It should be appreciated that the noise cancelling system 100 can be implemented in a form other than the in-vehicle type. For example, a variety of movable objects can be considered such as a two-wheel vehicle, an electric bicycle, an airplane, a drone, or a ship. In addition, a variety of power sources can be considered such as a thermal engine such as an external-combustion engine, an electrical machinery, or a fluid machinery. In addition, the noise cancelling system 100 needs not be mounted on a movable object. For example, the noise cancelling system 100 may be mounted on a fixedly-installed object such as a digital signage, or may be mounted on headphones, a smartphone, or the like.

Hereinafter, the noise reduction processing of the AFF method and the noise reduction processing of the FB method that are performed by the signal processing section 150 will be sequentially described.

<2.2. Noise Reduction Processing of AFF Method>

Hereinafter, the noise reduction processing of the AFF method will be described with reference to FIG. 4.

Figure 4:
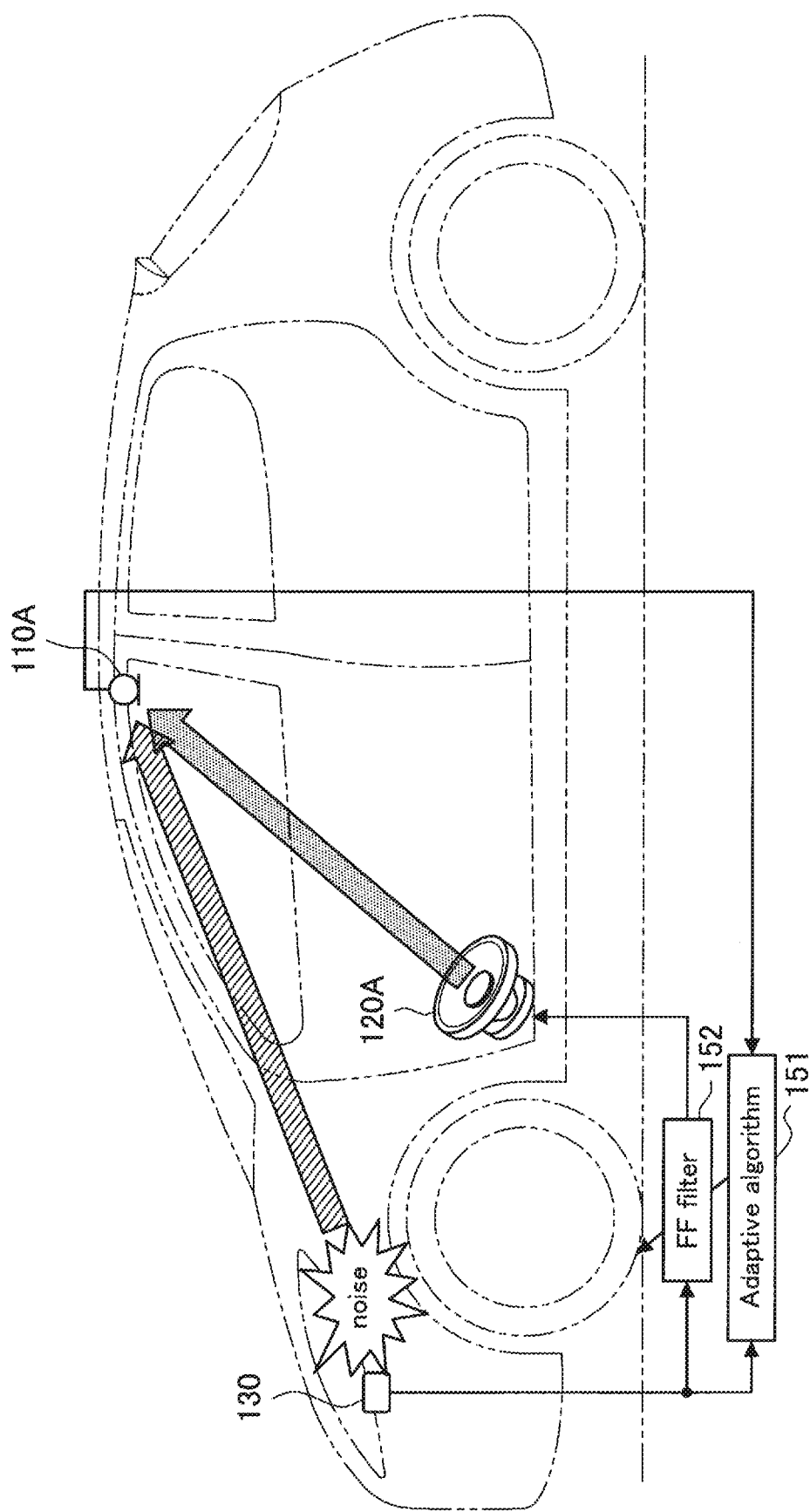
FIG. 4 is a diagram for describing noise reduction processing of an AFF method that is performed by the noise cancelling system according to the present embodiment.

FIG. 4 is a diagram for describing the noise reduction processing of the AFF method that is performed by the noise cancelling system 100 according to the present embodiment. As illustrated in FIG. 4, the processing involves the AFF microphone 110A, the AFF speaker 120A, the sensor section 130, an adaptive algorithm (Adaptive algorithm) 151, and a Feedforward filter (FF filter) 152. Note that the adaptive algorithm 151 and the FF filter 152 are included in the signal processing section 150.

The sensor section 130 acquires information indicating the number of revolutions of the engine of the vehicle. Hereinafter, the information will also be referred to as an rpm signal. In the noise reduction processing of a typical AFF method, the rpm signal is defined as a noise. Note that the sensor section 130 may collect an engine noise in place of or together with the number of revolutions of the engine, and regards the information as an rpm signal.

The AFF microphone 110A outputs a signal indicating a sound collection result. For example, the AFF microphone 110A collects a noise in a state of being reduced by the first noise reduction signal output from the AFF speaker 120A. The AFF microphone 110A is also referred to as an error microphone, and a signal output from the AFF microphone 110A is also referred to as an error microphone signal. A position of the error microphone is also referred to as a cancel target point (or a control point (Control Point)), and a noise cancellation effect at the position is the largest.

The adaptive algorithm 151 sets a filter coefficient of the FF filter 152. More specifically, the adaptive algorithm 151 calculates the filter coefficient using an adaptive algorithm on the basis of the reference signal output from the sensor section 130, and the error microphone signal output from the AFF microphone 110A. Then, the adaptive algorithm 151 sequentially rewrites the filter coefficient of the FF filter 152 to the calculated filter coefficient. Note that examples of an adaptive algorithm that can be used include least mean square (LMS) and the like.

The FF filter 152 generates the first noise reduction signal. More specifically, first of all, the FF filter 152 calculates a reference signal (i.e. noise) on the basis of the rpm signal output from the sensor section 130. Subsequently, the FF filter 152 generates the first noise reduction signal by applying (i.e. convolving) the filter coefficient set by the adaptive algorithm 151, to the reference signal.

The AFF speaker 120A outputs the first noise reduction signal output from the FF filter 152.

Here, a positional relationship of the AFF microphone 110A and the AFF speaker 120A will be described. As illustrated in FIG. 4, the AFF microphone 110A is installed on a ceiling inner side of the vehicle (i.e. vehicle inner side), for example, and the AFF speaker 120A is installed on a door inner side of the vehicle (i.e. vehicle inner side), for example. The speaker installed on the door inner side may be a speaker for music reproduction. In other words, the signal processing section 150 uses a speaker for music reproduction as the AFF speaker 120A. Note that, typically, a speaker for music reproduction that can be used as the AFF speaker 120A has a larger caliber as compared with a speaker installed on a headrest of a seat that can be used as the FB speaker 120B, which will be described later. In a case where a speaker for music reproduction that has a large caliber is used for noise reduction processing, it is possible to reduce a noise more effectively especially in a low bandwidth. Note that the music here is concept including any sound other than a noise reduction signal, such as radio voice, television voice, or navigation voice, aside from generally-said music.

<2.3. Noise Reduction Processing of FB Method>

Hereinafter, the noise reduction processing of the FB method will be described with reference to FIGS. 5 to 7.

Figure 5:
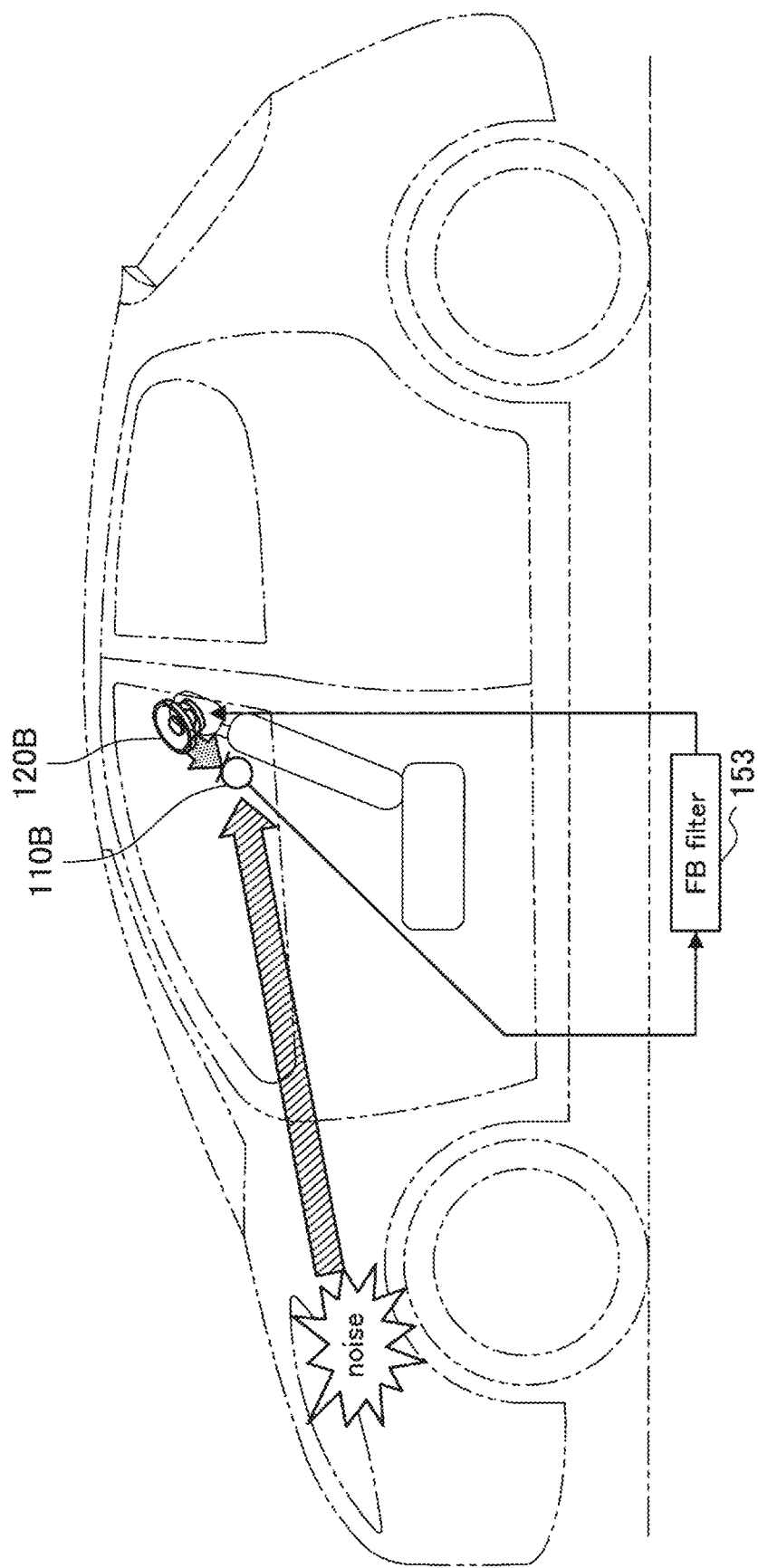
FIG. 5 is a diagram for describing noise reduction processing of a FB method that is performed by the noise cancelling system according to the present embodiment.
Figure 6:
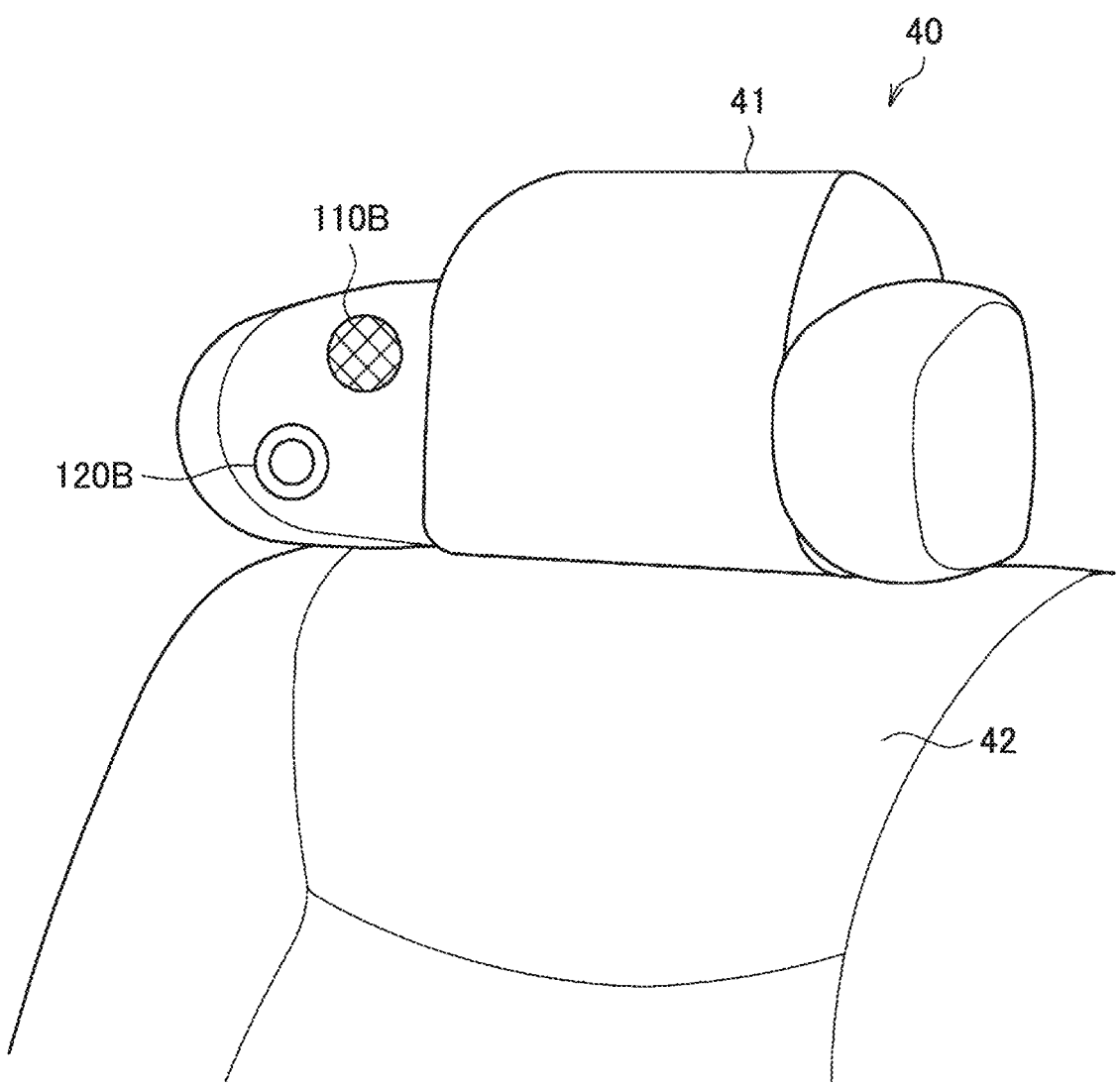
FIG. 6 is a diagram for describing noise reduction processing of a FB method that is performed by the noise cancelling system according to the present embodiment.
Figure 7:
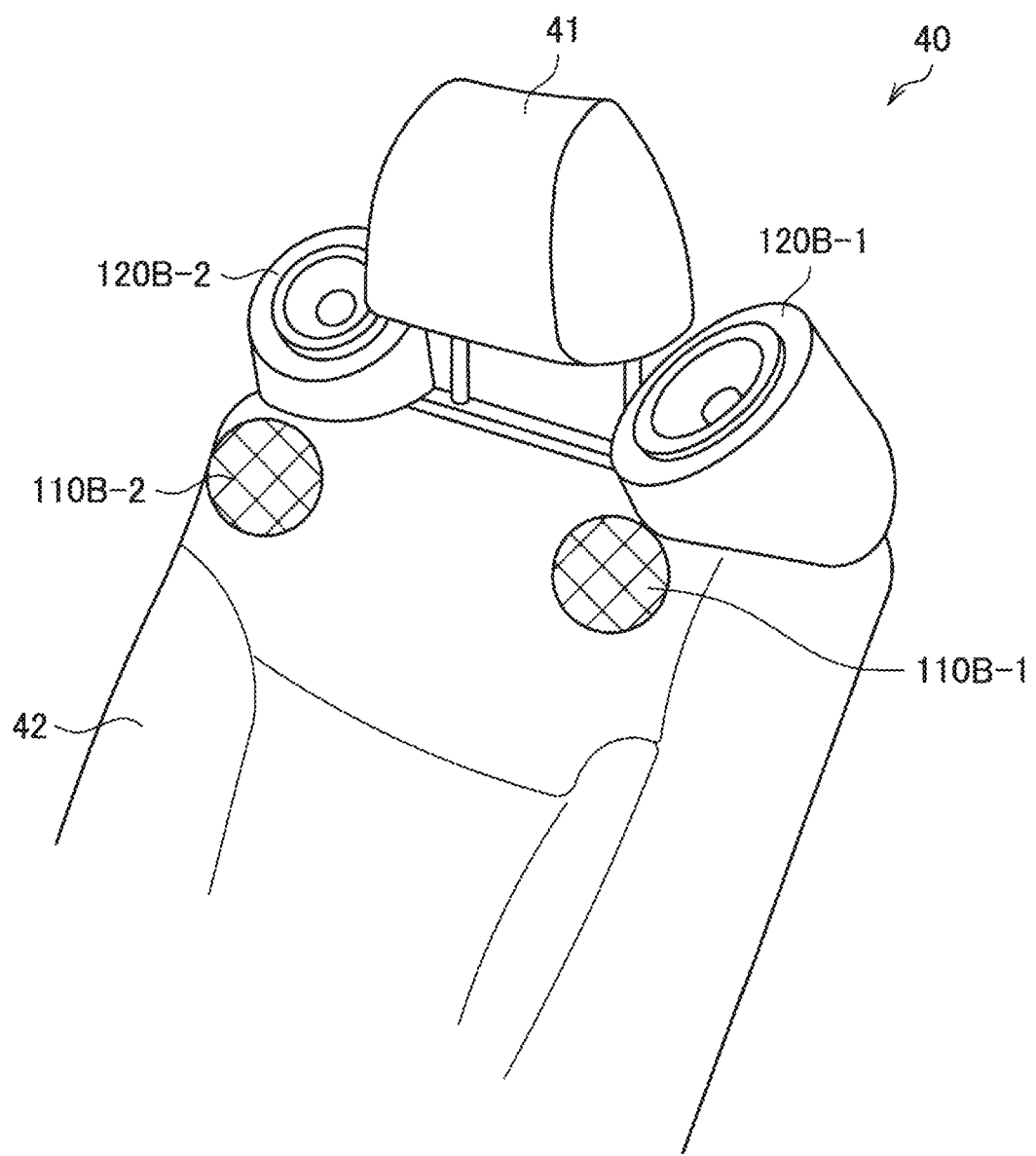
FIG. 7 is a diagram for describing noise reduction processing of a FB method that is performed by the noise cancelling system according to the present embodiment.

FIGS. 5 to 7 are diagrams for describing the noise reduction processing of the FB method that is performed by the noise cancelling system 100 according to the present embodiment. As illustrated in FIG. 5, the processing involves the FB microphone 110B, the FB speaker 120B, and a Feedback filter (FB filter) 153. Note that the FB filter 153 is included in the signal processing section 150.

The FB microphone 110B outputs a signal indicating a sound collection result. For example, the FB microphone 110B collects a noise in a state of being reduced by the second noise reduction signal output from the FB speaker 120B. A position of the FB microphone 110B is also referred to as a cancel target point, and a noise cancellation effect at the position is the largest.

The FB filter 153 generates the second noise reduction signal. More specifically, the FB filter 153 generates the second noise reduction signal by applying a filter coefficient set in a fixed manner, to a signal output from the FB microphone 110B.

The FB speaker 120B outputs the first noise reduction signal output from the FF filter 152.

Here, a positional relationship of the FB microphone 110B and the FB speaker 120B will be described in more detail with reference to FIG. 6. As illustrated in FIG. 6, the FB microphone 110B and the FB speaker 120B are installed near an ear of a user on a headrest 41 of a seat 40 in the vehicle, for example. By the FB microphone 110B and the FB speaker 120B being installed near the ear, it becomes possible to effectively reduce a noise delivered to the ear of the user.

It is desirable that a relative positional relationship of the FB microphone 110B and the FB speaker 120B is fixed. The relative positional relationship here is concept including a relative coordinate and a relative direction. This is because it is difficult to cause a filter coefficient to follow a change in relative positional relationship since a filter coefficient is set in a fixed manner in the noise reduction processing of the FB method.

For this reason, it is desirable that the signal processing section 150 uses, as the FB microphone 110B and the FB speaker 120B, a microphone and a speaker, respectively, that are provided on one component (i.e. unseparated component) among one or more components forming the seat. In the example illustrated in FIG. 6, among components such as the headrest 41, a seating face 42, and an armrest that form the seat 40, a microphone and a speaker that are provided on the headrest 41 are used as the FB microphone 110B and the FB speaker 120B, respectively. Thus, even if reclining or the like of the seat 40 is performed, for example, a relative positional relationship of the FB microphone 110B and the FB speaker 120B remains unchanged. Nevertheless, for example, when reclining or the like of the seat 40 is performed, absolute positions of the FB microphone 110B and the FB speaker 120B change. Note that the absolute position is concept including an absolute coordinate and an absolute direction in a movable object. For example, an absolute position in a vehicle means a position in a coordinate system having an origin corresponding to any position (e.g. engine, etc.) of the vehicle.

Note that, in a case where a relative positional relationship of the FB microphone 110B and the FB speaker 120B is variable, a filter coefficient to be set for the FB filter 153 may be switched in accordance with a change in the relative positional relationship. For example, in a case where the FB microphone 110B is provided on the seating face 42 and the FB speaker 120B is provided on the headrest 41, a filter coefficient to be set for the FB filter 153 may be switched in accordance with a height of the headrest 41. Nevertheless, the FB method has a lower degree of freedom in the setting of a filter coefficient, as compared with the AFF method of adaptively generating a filter coefficient, because the FB method merely selects a filter coefficient appropriately from filter coefficients prepared in advance.

Installation positions of the FB microphone 110B and the FB speaker 120B are not limited to those in the example illustrated in FIG. 6. Among one or more components forming a seat, a microphone and a speaker that are provided on any one component can be used as the FB microphone 110B and the FB speaker 120B, respectively. For example, as illustrated in FIG. 7, in the seat 40, a microphone and a speaker that are provided not on the headrest 41 but on the seating face 42 may be used as the FB microphone 110B and the FB speaker 120B, respectively. In the example illustrated in FIG. 7, a FB microphone 110B-1 and a FB speaker 120B-1 are installed at positions on the seating face 42 that correspond to the left shoulder of the user, and a FB microphone 110B-2 and a FB speaker 120B-2 are installed at positions on the seating face 42 that correspond to the right shoulder of the user. Also in this example, even if reclining or the like of the seat 40 is performed, for example, a relative positional relationship of the FB microphone 110B-1 or 110B-2 and the FB speaker 120B-1 or 120B-2 remains unchanged. Nevertheless, for example, when reclining or the like of the seat 40 is performed, absolute positions of the FB microphone 110B-1 or 110B-2 and the FB speaker 120B-1 or 120B-2 change.

3. VARIATIONS OF CONFIGURATION

A variety of arrangements of the AFF microphone 110A and the AFF speaker 120A, and the FB microphone 110B and the FB speaker 120B can be considered. For example, arrangements listed in the table described below can be considered.

TABLE 1

| Arrangement name | AFF/FB | Absolute position of microphone | Absolute position of speaker | Relative positional relationship of microphone and speaker |
|---|---|---|---|---|
| First arrangement | AFF | Fixed | Fixed | Fixed |
|  | FB | Variable | Variable | Fixed |
| Second arrangement | AFF | Variable | Fixed | Variable |
|  | FB |  | Variable | Fixed |
| Third arrangement | AFF | Fixed | Variable | Variable |
|  | FB | Variable |  | Fixed |
| Fourth arrangement | AFF | Variable | Variable | Fixed |
|  | FB |  |  |  |
| Fifth arrangement | AFF | Fixed | Fixed | Fixed |
|  | FB |  |  |  |
| Sixth arrangement | AFF | Fixed | Fixed | Fixed/variable |
|  | FB | Variable | Variable | Fixed |
|  |  | Variable | Variable |  |

It should be noted that a relative positional relationship of the FB microphone 110B and the FB speaker 120B is fixed in any arrangement. As described above, this is because it is difficult to cause a filter coefficient to follow a change in the relative positional relationship since a filter coefficient is set in a fixed manner in the noise reduction processing of the FB method. On the other hand, a relative positional relationship of the AFF microphone 110A and the AFF speaker 120A may be fixed or may be variable. This is because the noise reduction processing of the AFF method can easily cause a filter coefficient to follow a change in the relative positional relationship by adaptively generating a filter coefficient.

Hereinafter, each of the arrangements listed in the table described above will be described in detail. Note that, among the processes of the adaptive algorithm 151, the FF filter 152, and the FB filter 153, the description of portions similar to the portions described above will be omitted.

<3.1. First Arrangement>

Figure 8:
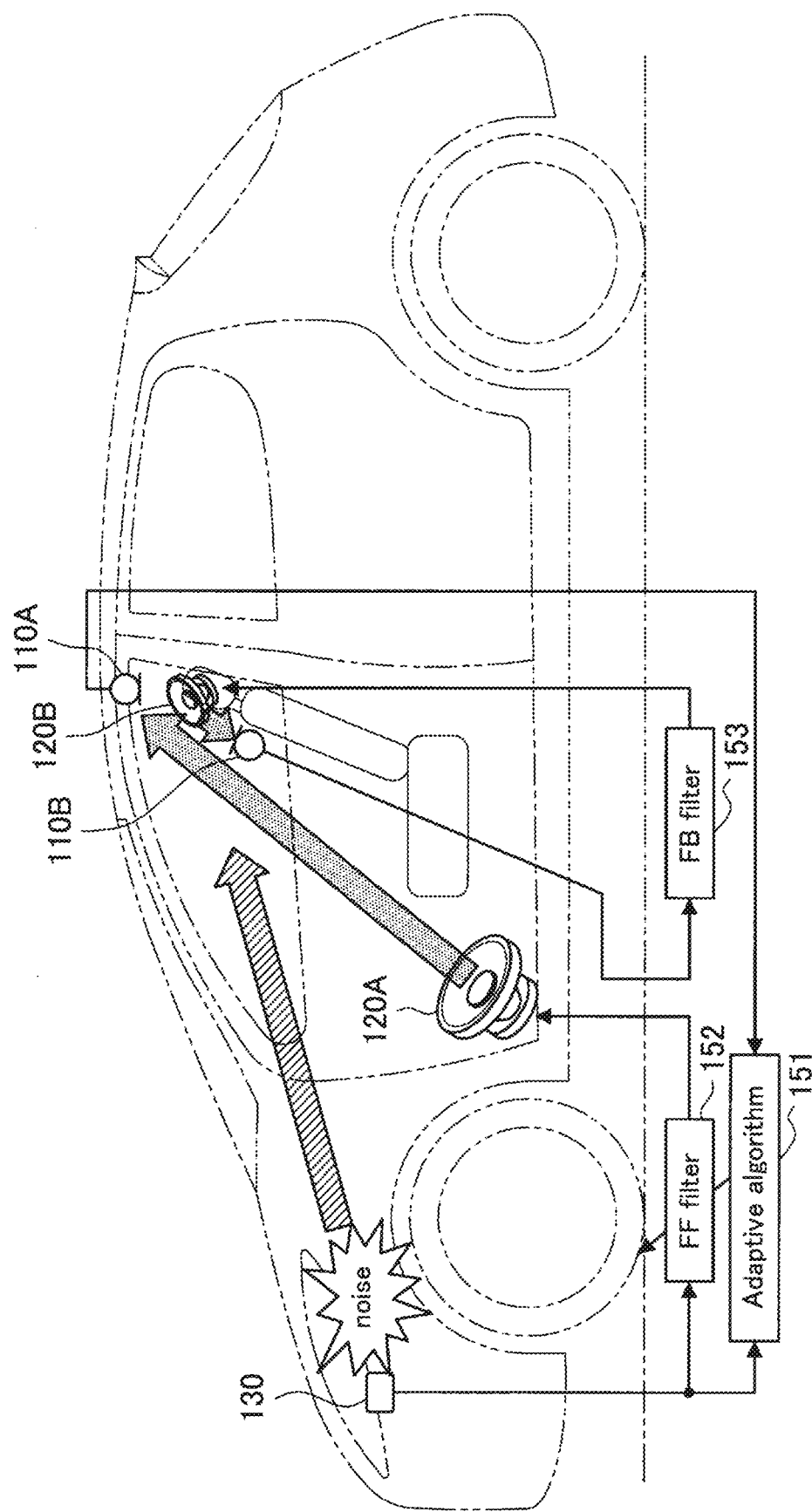
FIG. 8 is a diagram for describing a first arrangement of the noise cancelling system according to the present embodiment.

FIG. 8 is a diagram for describing a first arrangement of the noise cancelling system 100 according to the present embodiment. According to the arrangement illustrated in FIG. 8, the noise cancelling system 100 concurrently performs the noise reduction processing of the AFF method and the noise reduction processing of the FB method while separately using devices required for each processing. Hereinafter, the arrangement of a microphone and a speaker will be described in detail.

The signal processing section 150 uses, as the AFF microphone 110A and the AFF speaker 120A, a microphone and a speaker, respectively, that have a fixed relative positional relationship. In addition, the signal processing section 150 uses, as the AFF microphone 110A and the AFF speaker 120A, a microphone and a speaker, respectively, that have fixed absolute positions. In the example illustrated in FIG. 8, the AFF microphone 110A is installed on a ceiling inner side and the AFF speaker 120A is installed on a door inner side. For example, even if reclining or the like of a seat is performed, absolute positions and a relative positional relationship of the AFF microphone 110A and the AFF speaker 120A remain fixed. On the other hand, the signal processing section 150 uses, as the FB microphone 110B and the FB speaker 120B, a microphone and a speaker, respectively, that have a fixed relative positional relationship. In addition, the signal processing section 150 uses, as the FB microphone 110B and the FB speaker 120B, a microphone and a speaker, respectively, that have variable absolute positions. In the example illustrated in FIG. 8, the FB microphone 110B and the FB speaker 120B are installed on a headrest. For example, when reclining or the like of the seat is performed, the absolute positions change while a relative positional relationship of the FB microphone 110B and the FB speaker 120B remaining fixed.

According to such an arrangement, it becomes possible for the noise cancelling system 100 to reduce a variable peaky noise such as an engine noise and a broad noise such as a road noise and a wind noise.

<3.2. Second Arrangement>

Figure 9:
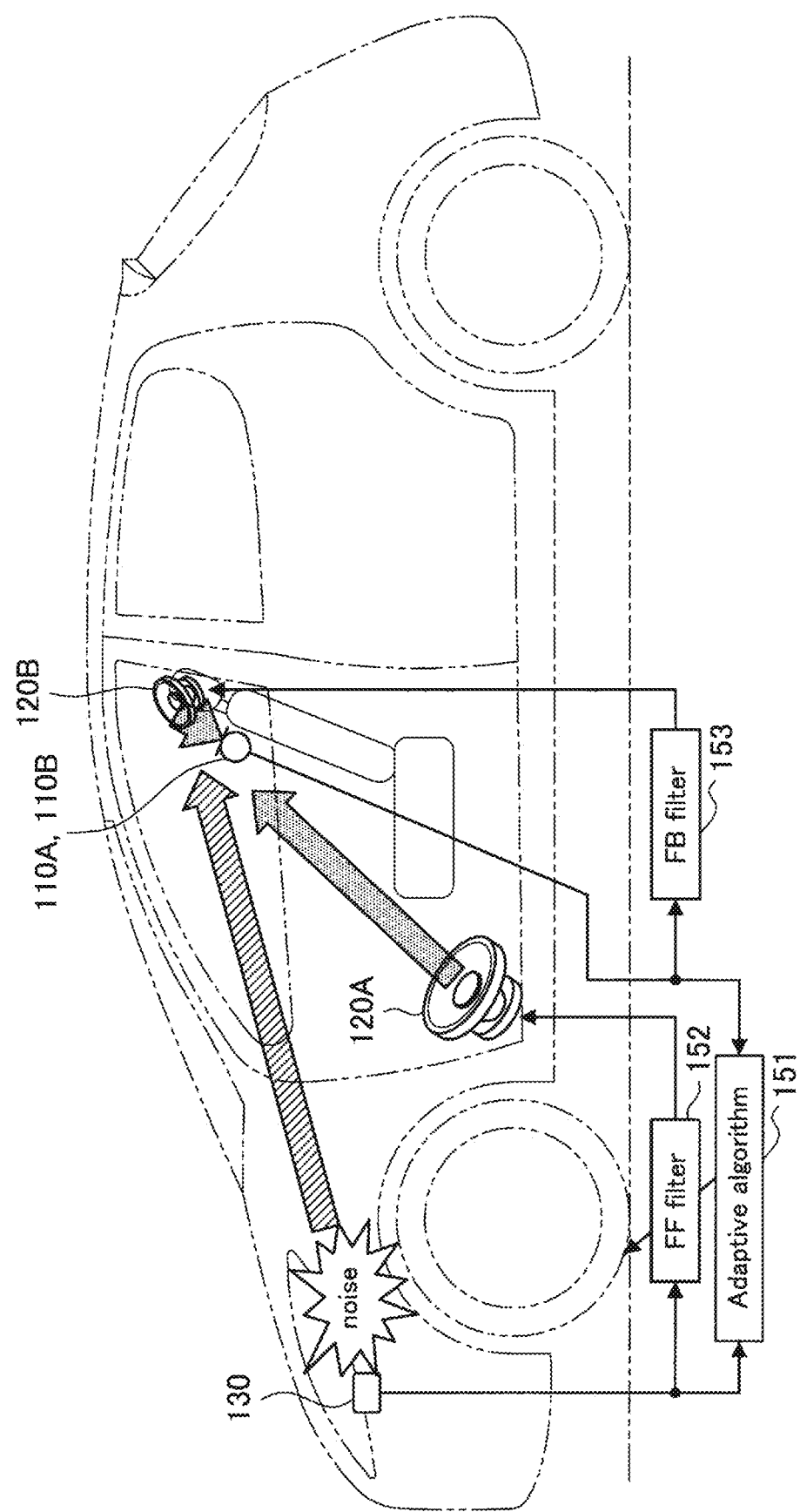
FIG. 9 is a diagram for describing a second arrangement of the noise cancelling system according to the present embodiment.

FIG. 9 is a diagram for describing a second arrangement of the noise cancelling system 100 according to the present embodiment. According to the arrangement illustrated in FIG. 9, the noise cancelling system 100 performs the noise reduction processing of the AFF method and the noise reduction processing of the FB method using a common microphone. Hereinafter, the arrangement of a microphone and a speaker will be described in detail.

The signal processing section 150 uses, as the AFF microphone 110A and the AFF speaker 120A, a microphone and a speaker, respectively, that have a variable relative positional relationship. In the example illustrated in FIG. 9, the AFF microphone 110A is installed on a headrest and the AFF speaker 120A is installed on a door inner side. For example, when reclining or the like of a seat is performed, an absolute position of the AFF microphone 110A changes, and relative positions of the AFF microphone 110A and the AFF speaker 120A change. On the other hand, the signal processing section 150 uses, as the FB microphone 110B and the FB speaker 120B, a microphone and a speaker, respectively, that have a fixed relative positional relationship. In the example illustrated in FIG. 9, the FB microphone 110B and the FB speaker 120B are installed on a headrest. For example, when reclining or the like of the seat is performed, absolute positions change while a relative positional relationship of the FB microphone 110B and the FB speaker 120B remaining fixed.

Here, the signal processing section 150 uses, as the AFF microphone 110A and the FB microphone 110B, the same microphone having a variable absolute position. In the example illustrated in FIG. 9, the signal processing section 150 uses one microphone installed on the headrest, as the AFF microphone 110A and also as the FB microphone 110B. A signal output from the microphone used as the AFF microphone 110A and the FB microphone 110B is input to the adaptive algorithm 151 and used for the generation of the first noise reduction signal, and input to the FB filter 153 and used for the generation of the second noise reduction signal.

In such an arrangement, because the number of microphones to be physically arranged can be decreased by one as compared with the first arrangement, a configuration becomes simpler and system design become easier. In addition, in this arrangement, because there is one cancel target point, an unnecessary diffraction system becomes inexistent and oscillation becomes less likely to be generated. Furthermore, even in a case where reclining or the like of the seat is performed, because at least the relative positional relationship of the FB microphone 110B and the speaker 120B is fixed, the noise cancelling system 100 can stably perform the noise reduction processing of the FB method.

<3.3. Third Arrangement>

Figure 10:
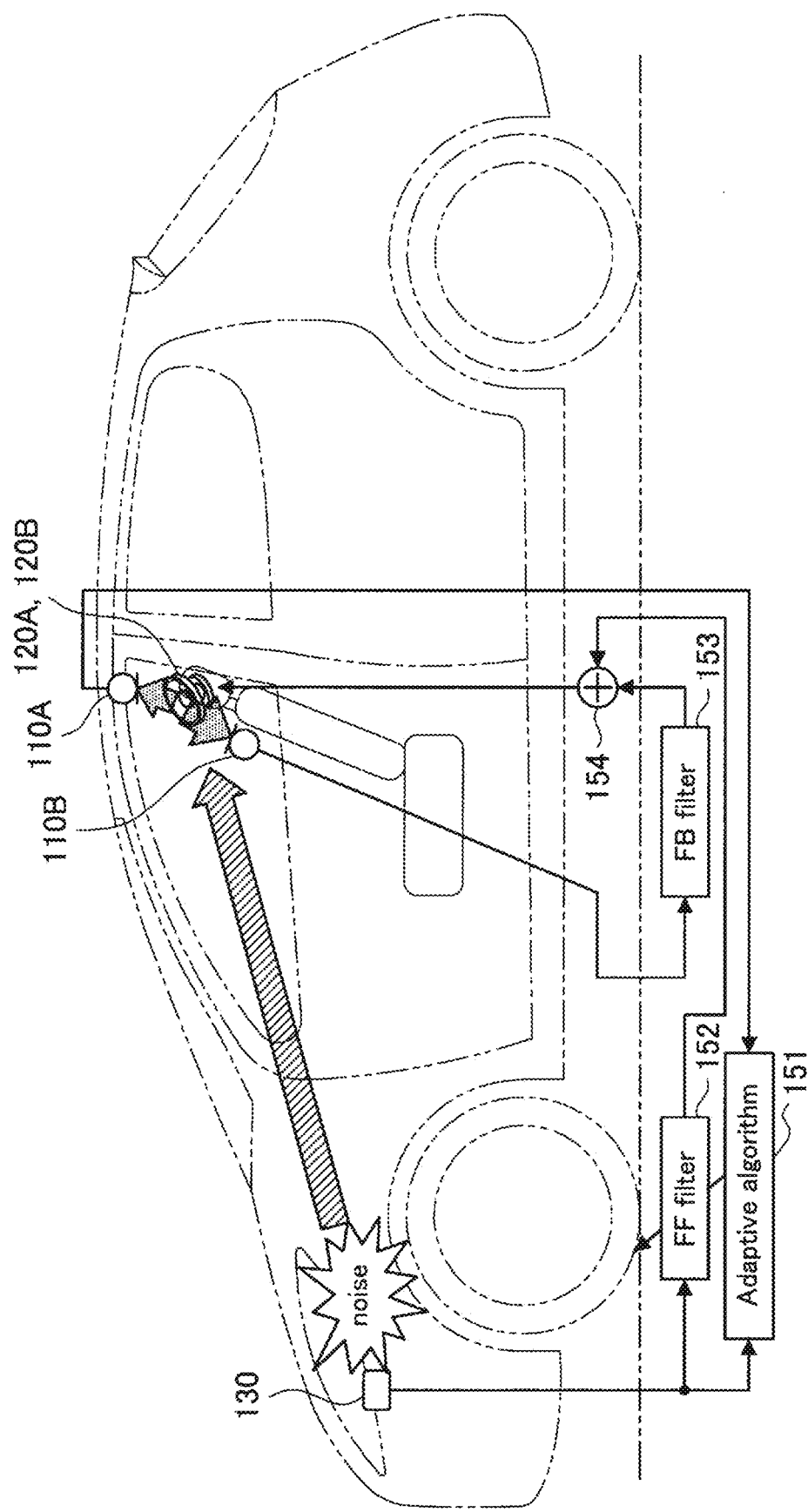
FIG. 10 is a diagram for describing a third arrangement of the noise cancelling system according to the present embodiment.

FIG. 10 is a diagram for describing a third arrangement of the noise cancelling system 100 according to the present embodiment. According to the arrangement illustrated in FIG. 10, the noise cancelling system 100 performs the noise reduction processing of the AFF method and the noise reduction processing of the FB method using a common speaker. Hereinafter, the arrangement of a microphone and a speaker will be described in detail.

The signal processing section 150 uses, as the AFF microphone 110A and the AFF speaker 120A, a microphone and a speaker, respectively, that have a variable relative positional relationship. In the example illustrated in FIG. 10, the AFF microphone 110A is installed on a ceiling inner side and the AFF speaker 120A is arranged on a headrest. For example, when reclining or the like of a seat is performed, an absolute position of the AFF speaker 120A changes, and relative positions of the AFF microphone 110A and the AFF speaker 120A change. On the other hand, the signal processing section 150 uses, as the FB microphone 110B and the FB speaker 120B, a microphone and a speaker, respectively, that have a fixed relative positional relationship. In the example illustrated in FIG. 10, the FB microphone 110B and the FB speaker 120B are installed on the headrest. For example, when reclining or the like of the seat is performed, absolute positions change while a relative positional relationship of the FB microphone 110B and the FB speaker 120B remaining fixed.

Here, the signal processing section 150 uses, as the AFF speaker 120A and the FB speaker 120B, the same speaker having a variable absolute position. In the example illustrated in FIG. 10, the signal processing section 150 uses one speaker installed on the headrest, as the AFF speaker 120A and also as the FB speaker 120B. The speaker used as the AFF speaker 120A and the FB speaker 120B outputs a signal indicating an addition result of the first noise reduction signal and the second noise reduction signal that is obtained by an adder 154.

Typically, a speaker for music reproduction is installed on a door inner side. With regard to this, according to this arrangement, the speaker for music reproduction that is installed on the door inner side is no longer used as the AFF speaker 120A. Thus, because the speaker for music reproduction does not output the first noise reduction signal, it becomes possible to eliminate pressure (e.g. overflow) on a dynamic range that is attributed to the first noise reduction signal. In addition, it becomes possible to separate a system of an amplifier between the first noise reduction signal and a signal for music reproduction. Note that this effect can be similarly caused also in a case where the AFF speaker 120A is installed aside from a speaker for music reproduction, without commonalizing a speaker.

In addition, in this arrangement, because the number of speakers to be physically arranged can be decreased by one as compared with the first arrangement, an effect similar to the second arrangement is caused. In other words, in this arrangement, a configuration becomes simpler and system design becomes easier as compared with the first arrangement. Furthermore, even in a case where reclining or the like of the seat is performed, because at least the relative positional relationship of the FB microphone 110B and the speaker 120B is fixed, the noise cancelling system 100 can stably perform the noise reduction processing of the FB method.

<3.4. Fourth Arrangement>

Figure 11:
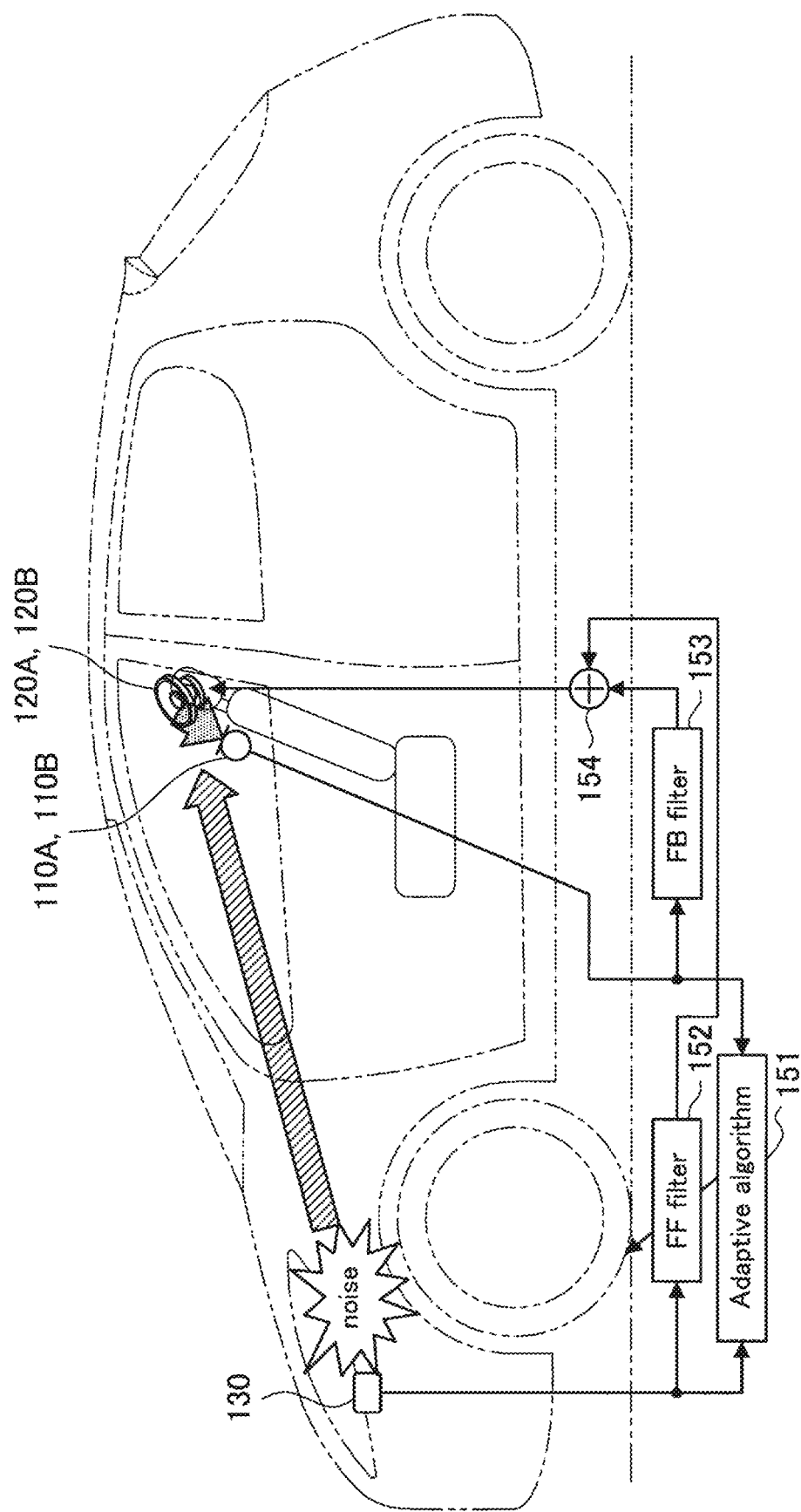
FIG. 11 is a diagram for describing a fourth arrangement of the noise cancelling system according to the present embodiment.

FIG. 11 is a diagram for describing a fourth arrangement of the noise cancelling system 100 according to the present embodiment. According to the arrangement illustrated in FIG. 11, the noise cancelling system 100 performs the noise reduction processing of the AFF method and the noise reduction processing of the FB method using a common microphone and a common speaker. Hereinafter, the arrangement of a microphone and a speaker will be described in detail.

The signal processing section 150 uses, as the AFF microphone 110A and the AFF speaker 120A, a microphone and a speaker, respectively, that have a fixed relative positional relationship. In the example illustrated in FIG. 11, the AFF microphone 110A and the AFF speaker 120A are installed on a headrest. For example, when reclining or the like of a seat is performed, absolute positions change while a relative positional relationship of the FB microphone 110B and the FB speaker 120B remaining fixed. On the other hand, the signal processing section 150 uses, as the FB microphone 110B and the FB speaker 120B, a microphone and a speaker, respectively, that have a fixed relative positional relationship. In the example illustrated in FIG. 11, the FB microphone 110B and the FB speaker 120B are installed on the headrest. For example, when reclining or the like of the seat is performed, absolute positions change while a relative positional relationship of the FB microphone 110B and the FB speaker 120B remaining fixed.

Here, the signal processing section 150 uses, as the AFF microphone 110A and the FB microphone 110B, the same microphone having a variable absolute position. In the example illustrated in FIG. 11, the signal processing section 150 uses one microphone installed on the headrest, as the AFF microphone 110A and also as the FB microphone 110B. A signal output from the microphone used as the AFF microphone 110A and the FB microphone 110B is input to the adaptive algorithm 151 and used for the generation of the first noise reduction signal, and input to the FB filter 153 and used for the generation of the second noise reduction signal. In addition, the signal processing section 150 uses, as the AFF speaker 120A and the FB speaker 120B, the same speaker having a variable absolute position. In the example illustrated in FIG. 11, the signal processing section 150 uses one speaker installed on the headrest, as the AFF speaker 120A and also as the FB speaker 120B. The speaker used as the AFF speaker 120A and the FB speaker 120B outputs a signal indicating an addition result of the first noise reduction signal and the second noise reduction signal that is obtained by the adder 154.

In this arrangement, because there is one microphone and one speaker, and a relative positional relationship of the microphone and the speaker is fixed, the effect caused by the second arrangement and the effect caused by the third arrangement are both caused.

<3.5. Fifth Arrangement>

Figure 12:
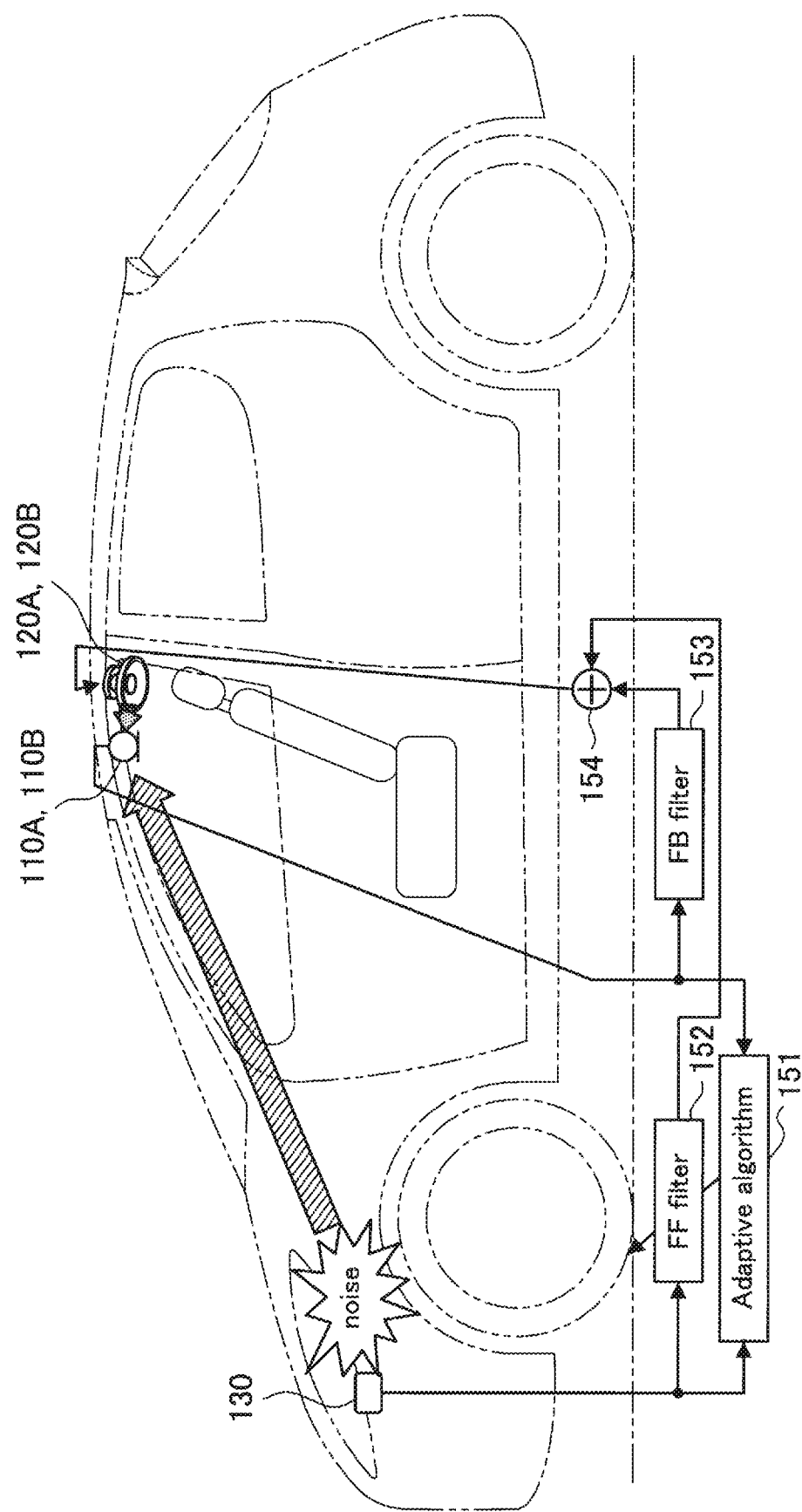
FIG. 12 is a diagram for describing a fifth arrangement of the noise cancelling system according to the present embodiment.

FIG. 12 is a diagram for describing a fifth arrangement of the noise cancelling system 100 according to the present embodiment. According to the arrangement illustrated in FIG. 12, the noise cancelling system 100 performs the noise reduction processing of the AFF method and the noise reduction processing of the FB method using a common microphone and a common speaker. Hereinafter, the arrangement of a microphone and a speaker will be described in detail.

The signal processing section 150 uses, as the AFF microphone 110A and the AFF speaker 120A, a microphone and a speaker, respectively, that have a fixed relative positional relationship. In the example illustrated in FIG. 11, the AFF microphone 110A and the AFF speaker 120A are installed on a ceiling inner side. For example, even if reclining or the like of a seat is performed, absolute positions and a relative positional relationship of the AFF microphone 110A and the AFF speaker 120A remain fixed. On the other hand, the signal processing section 150 uses, as the FB microphone 110B and the FB speaker 120B, a microphone and a speaker, respectively, that have a fixed relative positional relationship. In the example illustrated in FIG. 11, the FB microphone 110B and the FB speaker 120B are installed on a ceiling inner side. For example, even if reclining or the like of the seat is performed, absolute positions and a relative positional relationship of the FB microphone 110B and the FB speaker 120B remain fixed.

Here, the signal processing section 150 uses, as the AFF microphone 110A and the FB microphone 110B, the same microphone having a fixed absolute position. In the example illustrated in FIG. 12, the signal processing section 150 uses one microphone installed on the ceiling inner side, as the AFF microphone 110A and also as the FB microphone 110B. A signal output from the microphone used as the AFF microphone 110A and the FB microphone 110B is input to the adaptive algorithm 151 and used for the generation of the first noise reduction signal, and input to the FB filter 153 and used for the generation of the second noise reduction signal. In addition, the signal processing section 150 uses, as the AFF speaker 120A and the FB speaker 120B, the same speaker having a fixed absolute position. In the example illustrated in FIG. 12, the signal processing section 150 uses one speaker installed on the ceiling inner side, as the AFF speaker 120A and also as the FB speaker 120B. The speaker used as the AFF speaker 120A and the FB speaker 120B outputs a signal indicating an addition result of the first noise reduction signal and the second noise reduction signal that is obtained by the adder 154.

In this arrangement, because there is one microphone and one speaker, and a relative positional relationship of the microphone and the speaker is fixed, the effect caused by the second arrangement and the effect caused by the third arrangement are both caused.

<3.6. Sixth Arrangement>

Figure 13:
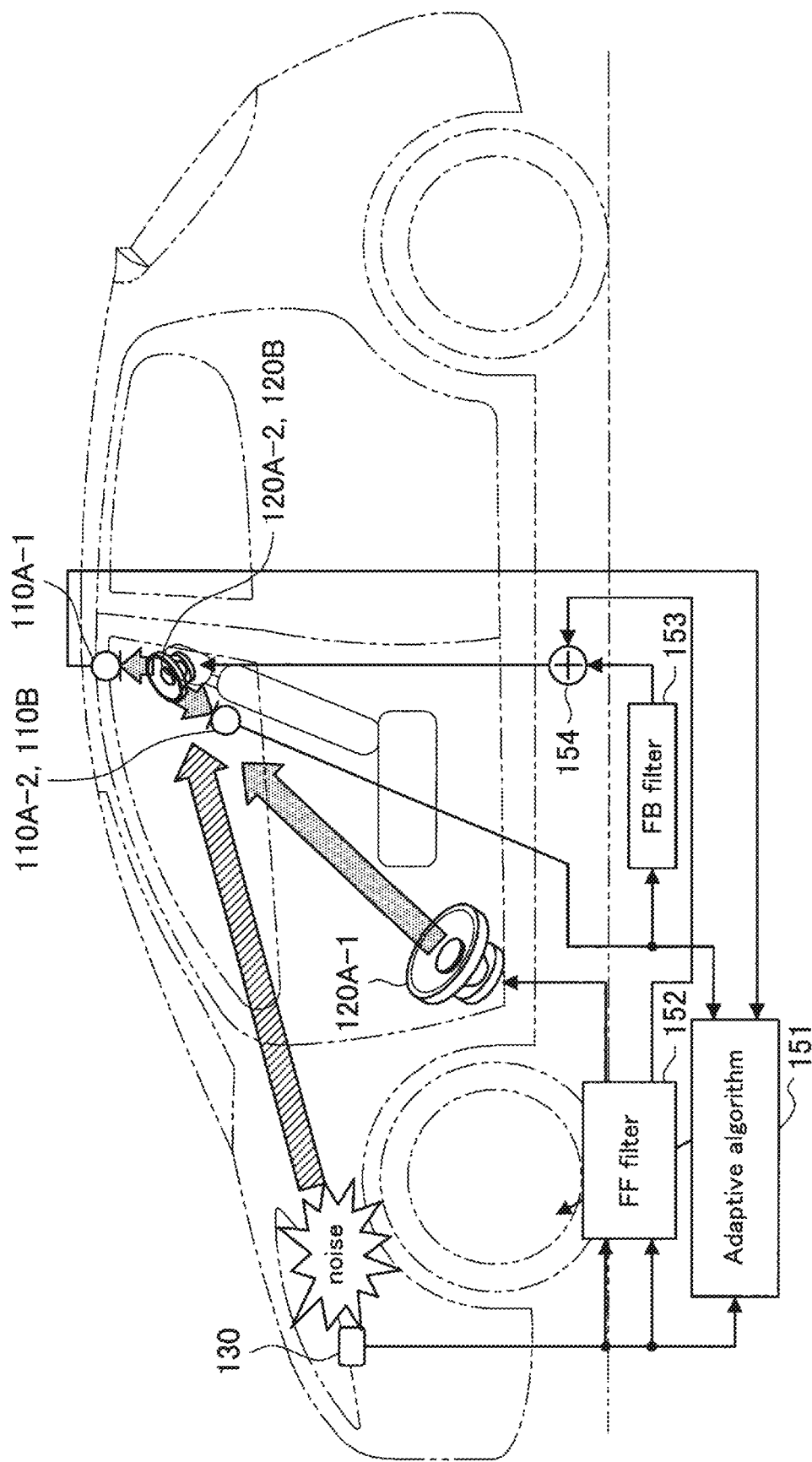
FIG. 13 is a diagram for describing a sixth arrangement of the noise cancelling system according to the present embodiment.

FIG. 13 is a diagram for describing a sixth arrangement of the noise cancelling system 100 according to the present embodiment. According to the arrangement illustrated in FIG. 13, the noise cancelling system 100 performs the noise reduction processing of the AFF method using a plurality of microphones and a plurality of speakers. Hereinafter, the arrangement of microphones and speakers will be described in detail.

The signal processing section 150 uses, as the AFF microphone 110A and the AFF speaker 120A, a plurality of microphones and a plurality of speakers, respectively. In the example illustrated in FIG. 13, an AFF microphone 110A-1 is installed on a ceiling inner side and an AFF microphone 110A-2 is installed on a headrest. In addition, an AFF speaker 120A-1 is installed on a door inner side and an AFF speaker 120A-2 is installed on the headrest.

The adaptive algorithm 151 sets a plurality of filter coefficients of the FF filter 152. More specifically, the adaptive algorithm 151 calculates the filter coefficients using an adaptive algorithm on the basis of a reference signal output from the sensor section 130, and error microphone signals output from the AFF microphones 110A-1 and 100A-2. Here, the adaptive algorithm 151 calculates two filter coefficients including a filter coefficient for the AFF speaker 120A-1 and a filter coefficient for the AFF speaker 120A-2. Then, the adaptive algorithm 151 sequentially rewrites two filter coefficients to be set for the FF filter 152, to the two calculated filter coefficients.

The FF filter 152 generates a plurality of first noise reduction signals for the plurality of AFF speakers 120A. More specifically, first of all, the FF filter 152 calculates a reference signal (i.e. noise) on the basis of an rpm signal output from the sensor section 130. Subsequently, the FF filter 152 generates the first noise reduction signal by applying the filter coefficient for the AFF speaker 120A-1 that has been set by the adaptive algorithm 151, to the reference signal, and causes the AFF speaker 120A-1 to output the generated first noise reduction signal. In addition, the FF filter 152 generates the first noise reduction signal by applying (i.e. convolving) the filter coefficient for the AFF speaker 120A-2 that has been set by the adaptive algorithm 151, to the reference signal, and causes the AFF speaker 120A-2 to output the generated first noise reduction signal.

Note that a microphone used as the AFF microphone 110A may be the same as a microphone used as the FB microphone 110B, or may be different from the microphone used as the FB microphone 110B. In the example illustrated in FIG. 13, the signal processing section 150 uses a microphone installed on the ceiling inner side, as the AFF microphone 110A-1, and uses one microphone installed on the headrest, as the AFF microphone 110A-2 and also as the FB microphone 110B. A signal output from the microphone used as the AFF microphone 110A-2 and the FB microphone 110B is input to the adaptive algorithm 151 and used for the generation of the first noise reduction signal, and input to the FB filter 153 and used for the generation of the second noise reduction signal.

In a similar manner, a speaker used as the AFF speaker 120A may be the same as a speaker used as the FB speaker 120B, or may be different from the speaker used as the FB speaker 120B. In the example illustrated in FIG. 13, the signal processing section 150 uses a speaker installed on the door inner side, as the AFF speaker 120A-1, and uses one speaker installed on the headrest, as the AFF speaker 120A-2 and also as the FB speaker 120B. The speaker used as the AFF speaker 120A-2 and the FB speaker 120B outputs a signal indicating an addition result of the first noise reduction signal and the second noise reduction signal that is obtained by the adder 154.

In addition, a relative positional relationship and absolute positions of a microphone and a speaker that are respectively used as the AFF microphone 110A and the AFF speaker 120A may be fixed or may be variable. For example, while the AFF microphone 110A-1 has a fixed relative positional relationship with the AFF speaker 120A-1, the AFF microphone 110A-1 has a variable relative positional relationship with the AFF speaker 120A-2. In addition, an absolute position of the AFF microphone 110A-1 is fixed, whereas an absolute position of the AFF microphone 110A-2 is variable.

The FB microphone 110B and the FB speaker 120B are as described in the first arrangement. Thus, the detailed description here will be omitted.

According to this arrangement, there is a plurality of routes from the AFF microphone 110A to the AFF speaker 120A. Because an effect of noise reduction processing varies depending on the route, by providing a plurality of routes, it becomes possible to enhance an effect of noise reduction processing.

<3.7. Switching of Arrangement>

Each of the arrangements listed in the table described above has been described above in detail. The noise cancelling system 100 may switch these arrangements in accordance with a situation.

More specifically, the setting section 160 sets an operation mode of the signal processing section 150. Then, the signal processing section 150 switches at least any of a microphone used as the AFF microphone 110A, a microphone used as the FB microphone 110B, a speaker used as the AFF speaker 120A, or a speaker used as the FB speaker 120B, in accordance with the operation mode set by the setting section 160. In this manner, the noise cancelling system 100 can adopt an appropriate arrangement in accordance with a situation.

For example, the setting section 160 may set an operation mode in accordance with the presence or absence of an output of a signal other than a noise reduction signal (i.e. first noise reduction signal or second noise reduction signal) from a speaker that can be used as the AFF speaker 120A. Specifically, the setting section 160 sets an operation mode in accordance with the presence or absence of an output of a signal for music reproduction from a speaker for music reproduction that is installed on a door inner side. For example, in a case where a signal for music reproduction is output from a speaker for music reproduction that is installed on a door inner side, the setting section 160 sets an operation mode of adopting the above-described third arrangement. The noise cancelling system 100 can thereby separate the speaker for music reproduction from noise reduction processing, prevent load on music reproduction processing, and maintain sound quality of music, in a case where music is reproduced. On the other hand, in a case where a signal for music reproduction is not output from a speaker for music reproduction that is installed on a door inner side, the setting section 160 sets an operation mode of adopting the above-described first arrangement. The noise cancelling system 100 can thereby reduce a noise more effectively especially in a low bandwidth, by using a speaker for music reproduction that has a large caliber, for noise reduction processing, in a case where music is not reproduced.

Additionally, the setting section 160 may automatically set an operation mode on the basis of any trigger. In this case, the noise cancelling system 100 may notify the user of the set operation mode using any output apparatus such as a navigation apparatus. In addition, the setting section 160 may set an operation mode in accordance with a manual input from the user.

4. HARDWARE CONFIGURATION EXAMPLE

The technology according to the present disclosure can be applied to various products. For example, the noise cancelling system 100 may be implemented as an apparatus to be mounted on a vehicle of a certain type such as an automobile, an electric bicycle, a hybrid electric vehicle, and a motorcycle. In addition, at least part of the structural elements of the noise cancelling system 100 may be implemented in a module for an apparatus to be mounted on a vehicle (e.g. integrated circuit module formed by one die).

Figure 14:
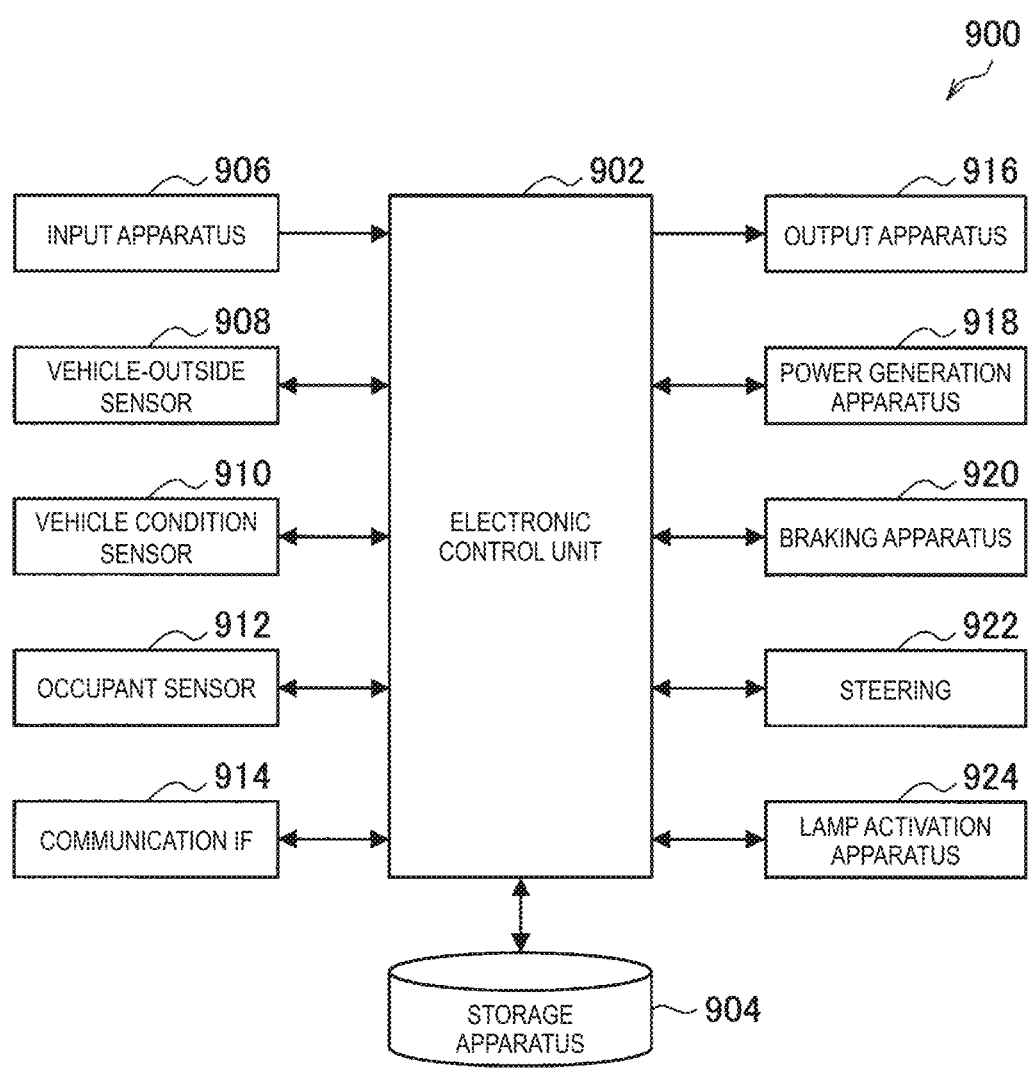
FIG. 14 is a block diagram illustrating an example of a schematic configuration of a vehicle system.

FIG. 14 is a block diagram illustrating an example of the schematic configuration of the vehicle control system 900 to which the technology according to the present disclosure can be applied. The vehicle control system 900 includes an electronic control unit 902, a storage apparatus 904, an input apparatus 906, a vehicle-outside sensor 908, a vehicle condition sensor 910, an occupant sensor 912, a communication IF 914, an output apparatus 916, a power generation apparatus 918, a braking apparatus 920, a steering 922, and a lamp activation apparatus 924.

The electronic control unit 902 functions as an operation processing apparatus and a control apparatus, and controls the overall operation of the vehicle control system 900 in accordance with a variety of programs. The electronic control unit 902 can be configured as an electronic control unit (ECU) along with the storage apparatus 904 described below. A plurality of ECUs (i.e. electronic control unit 902 and storage apparatus 904) may be included in the vehicle control system 900. For example, ECUs for controlling each of various sensors or various drive systems may be provided thereto, and an ECU for controlling the plurality of those ECUs in cooperative manner may be further provided. The plurality of these ECUs are connected via an in-vehicle communication network such as a controller area network (CAN), a local interconnect network (LIN), a local area network (LAN), or Flexray that is compliant with any standard. The electronic control unit 902 forms one or more structural elements (i.e. the signal processing section 150 and/or the setting section 160) included in the control section 170 illustrated in FIG. 3, for example. In the present embodiment, the electronic control unit 902 generates the first noise reduction signal and the second noise reduction signal.

The storage apparatus 904 is an apparatus for data storage which is configured as an example of a storage section of the vehicle control system 900. The storage apparatus 904 is implemented, for example, by a magnetic storage section device such as a HDD, a semiconductor storage device, an optical storage device, a magneto-optical storage device, or the like. The storage apparatus 904 may include a storage medium, a recording apparatus that records data in the storage medium, a readout apparatus that reads out data from the storage medium, a deletion apparatus that deletes data recoded in the storage medium, and the like. This storage apparatus 904 stores a program to be executed by the electronic control unit 902, various kinds of data, various kinds of data acquired from the outside, and the like. The storage apparatus 904 can form the storage section 140 illustrated in FIG. 3, for example.

The input apparatus 906 is implemented, for example, by an apparatus such as a mouse, a keyboard, a touch panel, a button, a microphone, a switch, and a lever into which an occupant (driver or passenger) inputs information. In addition, the input apparatus 906 may be, for example, a remote control apparatus using infrared light or other radio waves, or may be an external connection device such as a mobile phone or a PDA supporting the operation of the vehicle control system 900. In addition, the input apparatus 906 may be, for example, a camera. In that case, an occupant can input information according to a gesture. Further, the input apparatus 906 may include an input control circuit or the like that generates an input signal, for example, on the basis of information input by a user using the above-described input means, and outputs the generated input signal to the electronic control unit 902. The occupant is able to input various kinds of data to the vehicle control system 900 or instruct the vehicle control system 900 about a processing operation by operating this input apparatus 906.

The vehicle-outside sensor 908 is implemented by a sensor that detects information of the outside of the vehicle. For example, the vehicle-outside sensor 908 may include a sonar apparatus, a radar apparatus, a light detection and ranging or laser imaging detection and ranging (LIDAR) apparatus, a camera, a stereo-camera, a time of flight (ToF) camera, an infrared sensor, an environment sensor, a microphone, or the like.

The vehicle condition sensor 910 is implemented by a sensor that detects information regarding a vehicle condition. For example, the vehicle condition sensor 910 may include a sensor that detects an operation performed by a driver such as an accelerator opening degree, brake stepping force, or a steering wheel angle. In addition, the vehicle condition sensor 910 may include a sensor that detects a condition of a power source such as the number of revolutions or torque of an internal combustion engine or a motor. In addition, the vehicle condition sensor 910 may include a sensor such as a gyro sensor or an acceleration sensor for detecting information regarding the movement of the vehicle. In addition, the vehicle condition sensor 910 may include a global navigation satellite system (GNSS) module that receives GNSS signals (e.g. global positioning system (GPS) signals from a GPS satellite) from a GNSS satellite, and measures position information including the latitude, longitude, and altitude of the apparatus. Note that, with respect to the position information, the vehicle condition sensor 910 may sense the position through Wi-Fi (registered trademark), transmission and reception to and from a mobile phone/PHS/smartphone or the like, near field communication, or the like. The vehicle condition sensor 910 can form the sensor section 130 illustrated in FIG. 3, for example.

The occupant sensor 912 is implemented by a sensor that detects information regarding an occupant. For example, the occupant sensor 912 may include a camera, a microphone, and an environment sensor provided to a vehicle compartment. In addition, the occupant sensor 912 may include a biometric sensor that detects biometric information of an occupant. The biometric sensor is attached, for example, to a seating face, the steering wheel, or the like, and is capable of detecting biometric information of the occupant sitting on the seat or the driver gripping the steering. The occupant sensor 912 can form the microphone 110 illustrated in FIG. 3, for example. In the present embodiment, the microphone 110 is formed on a door inner side, a ceiling inner side, or a headrest, and detects a sound in the vehicle.

Note that various sensors such as the vehicle-outside sensor 908, the vehicle condition sensor 910, and the occupant sensor 912 each output information showing a detection result to the electronic control unit 902. These various sensors may set the sensing area, accuracy, or the like on the basis of the control of the electronic control unit 902. In addition, these various sensors may include a recognition module that performs recognition processing based on raw data such as processing of recognizing the driving position of an own vehicle on a road, for example, on the basis of the position of a lane line included in a taken captured image.

The communication IF 914 is a communication interface that mediates communication performed by the vehicle control system 900 with another apparatus. The communication IF 914 can include, for example, a V2X communication module. Note that V2X communication is a concept including vehicle-to-vehicle communication and vehicle-to-infrastructure communication. Additionally, the communication IF 914 may also include a communication module for a wireless local area network (LAN), Wi-Fi (registered trademark), 3G, long term evolution (LTE), Bluetooth (registered trademark), near field communication (NFC) or wireless USB (WUSB). This communication IF 914 is capable of transmitting and receiving signals or the like, for example, to and from the Internet or other communication devices outside the vehicle in compliance with a predetermined protocol, for example, TCP/IP or the like.

The output apparatus 916 is implemented by an apparatus capable of visually or aurally notifying an occupant of acquired information. Such an apparatus includes a display apparatus such as an instrument panel, a head-up display, a projector or a lamp, and a sound output apparatus such as a speaker or headphones. Specifically, the display apparatus visually displays results obtained from various kinds of processing performed by the vehicle control system 900 in a variety of forms such as text, an image, a table, and a graph. At that time, a virtual object such as an augmented reality (AR) object may be displayed. Meanwhile, the sound output apparatus converts audio signals including reproduced sound data, acoustic data, or the like into analog signals, and aurally outputs the analog signals. The above-described sound output apparatus can form the speaker 120 illustrated in FIG. 3, for example. In the present embodiment, the speaker 120 is formed on a door inner side, a ceiling inner side, or a headrest, and the first noise reduction signal and the second noise reduction signal are output.

The power generation apparatus 918 is an apparatus for generating driving force for the vehicle. The power generation apparatus 918 may be implemented, for example, by an internal combustion engine. In that case, the power generation apparatus 918 performs start control, stop control, throttle valve opening degree control, fuel injection control, exhaust gas recirculation (EGR) control, or the like on the basis of a control command from an electronic control unit 902. In addition, the power generation apparatus 918 may be implemented, for example, by a motor, an inverter, and a battery. In that case, the power generation apparatus 918 can supply electric power from the battery to the motor via the inverter on the basis of a control command from the electronic control unit 902, and perform a motor operation (so-called powering) to output positive torque and a regenerative operation to cause the motor to absorb torque to generate electric power, and charge the battery via the inverter.

The braking apparatus 920 is an apparatus for providing braking force to the vehicle, or causing the vehicle to decelerate or stop. The braking apparatus 920 can include, for example, a brake installed at each wheel, and a brake pipe for transmitting the force of stepping on the brake pedal to the brake, an electronic circuit or the like. In addition, the braking apparatus 920 may include a control apparatus such as an antilock brake system (ABS) or an electronic stability control (ESC) for activating a mechanism of preventing a slide or a skid caused by brake control.

The steering 922 is an apparatus for controlling the advancing direction (steering angle) of the vehicle. The steering 922 can include, for example, a steering wheel, a steering shaft, a steering gear, a tie rod, and the like. In addition, the steering 922 can include a power steering for assisting a driver in steering. Further, the steering 922 can include a power source such as a motor for allowing for automatic steering.

The lamp activation apparatus 924 is an apparatus that activates various lamps such as a head light, a turn signal, a position lamp, a fog light, or a stop lamp. The lamp activation apparatus 924 controls, for example, the blinking of the lamps, the amount of light, the light-emitting direction, or the like.

Note that the power generation apparatus 918, the braking apparatus 920, the steering 922, and the lamp activation apparatus 924 may come into operation on the basis of a manual operation performed by a driver or on the basis of an automatic operation performed by the electronic control unit 902.

An example of a hardware configuration that can implement the functions of the noise cancelling system 100 according to the present embodiment has been described above. Each of the above-described structural elements may be implemented using a general-purpose member, or may be implemented by hardware specialized in the function of each structural element. Accordingly, it is possible to appropriately change a hardware configuration to be used, in accordance with a technical level at the time when the present embodiment is implemented.

Note that a computer program for implementing each of the functions of the noise cancelling system 100 according to the present embodiment as described above can be created, and may be mounted on an ECU or the like. In addition, a computer-readable recording medium storing such a computer program can be provided. The recording medium is a magnetic disc, an optical disc, a magneto-optical disc, a flash memory, or the like, for example. In addition, the above-described computer program may be delivered via a network, for example, without using the recording medium.

5. CONCLUSION

An embodiment of the present disclosure has been described above in detail with reference to FIGS. 1 to 14. As described above, the noise cancelling system 100 according to the present embodiment generates a first noise reduction signal using an adaptive filter on the basis of a signal output from a first input apparatus, causes the generated first noise reduction signal to be output by a first output apparatus, generates a second noise reduction signal using a fixed filter on the basis of a signal output from a second input apparatus, and causes the generated second noise reduction signal to be output by a second output apparatus. In the present embodiment, because two types of noise reduction processing with different methods are used in combination, it becomes possible to reduce both noises targeted by the respective methods.

For example, a case where the noise cancelling system 100 is mounted on a vehicle will be described. The noise cancelling system 100 uses, in combination, an adaptive filter excelling at reduction of a variable peaky noise such as an engine noise, and a fixed filter excelling at reduction of a broad noise such as a road noise and a wind noise. Thus, the noise cancelling system 100 according to the present embodiment can reduce more noises in a wide bandwidth at the time of actual running of the vehicle.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above-described arrangements may be appropriately used in combination.

In addition, the noise cancelling system 100 described in this specification may be implemented as an independent apparatus, or a part or all thereof may be implemented as a separate apparatus. For example, among the functional configuration examples of the noise cancelling system 100 that are illustrated in FIG. 3, the storage section 140, the signal processing section 150, and the setting section 160 may be included in an apparatus such as a server that is connected via a network or the like with the microphone 110, the speaker 120, and the sensor section 130.

In addition, the signal processing described in this specification with reference to FIG. 4 or the like is executed in an order following a flow of data that is indicated by an arrow. Nevertheless, an additional processing step may be added. In addition, the noise reduction processing of the AFF method and the noise reduction processing of the FB method can be concurrently executed.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A signal processing apparatus including:

a signal processing section configured to generate a first noise reduction signal using an adaptive filter on the basis of a signal output from a first input apparatus, and cause the generated first noise reduction signal to be output by a first output apparatus, and generate a second noise reduction signal using a fixed filter on the basis of a signal output from a second input apparatus, and cause the generated second noise reduction signal to be output by a second output apparatus.

(2)

The signal processing apparatus according to (1), in which the first noise reduction signal targets a noise with a narrow frequency bandwidth, and the second noise reduction signal targets a noise with a wide frequency bandwidth.

(3)

The signal processing apparatus according to (2), in which the first noise reduction signal targets a noise corresponding to the number of revolutions of a power source that performs a revolving motion, and the second noise reduction signal targets a noise corresponding to a movement performed by a movable object using the power source.

(4)

The signal processing apparatus according to (3), in which the power source is an internal combustion engine or a motor, and the movable object is a vehicle.

(5)

The signal processing apparatus according to any one of (1) to (4), in which the signal processing section uses, as the first input apparatus and the first output apparatus, an input apparatus and an output apparatus that have a fixed relative positional relationship, respectively, and uses, as the second input apparatus and the second output apparatus, an input apparatus and an output apparatus that have a fixed relative positional relationship, respectively.

(6)

The signal processing apparatus according to (5), in which the signal processing section uses, as the first input apparatus and the first output apparatus, an input apparatus and an output apparatus that have fixed absolute positions, respectively, and uses, as the second input apparatus and the second output apparatus, an input apparatus and an output apparatus that have variable absolute positions, respectively.

(7)

The signal processing apparatus according to (5), in which the signal processing section uses, as the first input apparatus and the second input apparatus, a same input apparatus having a variable absolute position, and uses, as the first output apparatus and the second output apparatus, a same output apparatus having a variable absolute position.

(8)

The signal processing apparatus according to (5), in which the signal processing section uses, as the first input apparatus and the second input apparatus, a same input apparatus having a fixed absolute position, and uses, as the first output apparatus and the second output apparatus, a same output apparatus having a fixed absolute position.

(9)

The signal processing apparatus according to any one of (1) to (4), in which the signal processing section uses, as the first input apparatus and the first output apparatus, an input apparatus and an output apparatus that have a variable relative positional relationship, respectively, and uses, as the second input apparatus and the second output apparatus, an input apparatus and an output apparatus that have a fixed relative positional relationship, respectively.

(10)

The signal processing apparatus according to (9), in which the signal processing section uses, as the first input apparatus and the second input apparatus, a same input apparatus having a variable absolute position.

(11)

The signal processing apparatus according to (9), in which the signal processing section 150 uses, as the first output apparatus and the second output apparatus, a same output apparatus having a variable absolute position.

(12)

The signal processing apparatus according to any one of (1) to (11), in which the signal processing section uses, as the first input apparatus and the first output apparatus, a plurality of input apparatuses and a plurality of output apparatuses, respectively.

(13)

The signal processing apparatus according to any one of (1) to (12), in which the signal processing section uses an output apparatus for music reproduction, as the first output apparatus.

(14)

The signal processing apparatus according to any one of (1) to (13), in which the signal processing section uses, as the second input apparatus and the second output apparatus, an input apparatus and an output apparatus, respectively, that are provided on one component among one or more components forming a seat.

(15)

The signal processing apparatus according to any one of (1) to (14), further including a setting section configured to set an operation mode of the signal processing section, in which the signal processing section switches at least any of an input apparatus used as the first input apparatus, an input apparatus used as the second input apparatus, an output apparatus used as the first output apparatus, or an output apparatus used as the second output apparatus, in accordance with the operation mode set by the setting section.

(16)

The signal processing apparatus according to (15), in which the setting section sets the operation mode in accordance with presence or absence of an output of a signal other than the first noise reduction signal or the second noise reduction signal from an output apparatus that can be used as the first output apparatus.

(17)

A method executed by a processor, the method including:

generating a first noise reduction signal using an adaptive filter on the basis of a signal output from a first input apparatus, and causing the generated first noise reduction signal to be output by a first output apparatus; and generating a second noise reduction signal using a fixed filter on the basis of a signal output from a second input apparatus, and causing the generated second noise reduction signal to be output by a second output apparatus.

(18)

A recording medium having a program recorded thereon, the program causing a computer to function as:

a signal processing section configured to generate a first noise reduction signal using an adaptive filter on the basis of a signal output from a first input apparatus, and cause the generated first noise reduction signal to be output by a first output apparatus, and generate a second noise reduction signal using a fixed filter on the basis of a signal output from a second input apparatus, and cause the generated second noise reduction signal to be output by a second output apparatus.

REFERENCE SIGNS LIST

100 noise cancelling system
110 microphone
110A AFF microphone
110B FB microphone
120 speaker
120A AFF speaker
120B FB speaker
130 sensor section
140 storage section
150 signal processing section
151 adaptive algorithm
152 FF filter
153 FB filter
154 adder
160 setting section
170 control section

The invention claimed is:

1. A signal processing apparatus comprising:

a signal processor configured to:

generate a first noise reduction signal using an adaptive filter on a basis of a signal output from a first input apparatus, and cause the generated first noise reduction signal to be output by a first output apparatus, the first input apparatus being located at a first noise-cancellation target location in an environment, and the generated first noise reduction signal being output to the environment by the first output apparatus, and generate a second noise reduction signal using a feedback filter on a basis of a signal output from a second input apparatus, and cause the generated second noise reduction signal to be output by a second output apparatus, the feedback filter having a fixed feedback coefficient, the second input apparatus being located at a second noise-cancellation target location in the environment different from the first noise-cancellation target location, and the generated second noise reduction signal being output to the environment by the second output apparatus.

2. The signal processing apparatus according to claim 1, wherein
the first noise reduction signal targets a noise with a narrow frequency bandwidth, and
the second noise reduction signal targets a noise with a wide frequency bandwidth.

3. The signal processing apparatus according to claim 2, wherein
the first noise reduction signal targets a noise corresponding to a number of revolutions of a power source that performs a revolving motion, and
the second noise reduction signal targets a noise corresponding to a movement performed by a movable object using the power source.

4. The signal processing apparatus according to claim 3, wherein the power source is an internal combustion engine or a motor, and the movable object is a vehicle.

5. The signal processing apparatus according to claim 1, wherein the signal processor:
uses, as the first input apparatus and the first output apparatus, an input apparatus and an output apparatus that have a first fixed relative positional relationship, respectively, and
uses, as the second input apparatus and the second output apparatus, an input apparatus and an output apparatus that have a second fixed relative positional relationship, respectively.

6. The signal processing apparatus according to claim 5, wherein the signal processor:
uses, as the first input apparatus and the first output apparatus, an input apparatus and an output apparatus that have fixed absolute positions, respectively, and
uses, as the second input apparatus and the second output apparatus, an input apparatus and an output apparatus that have variable absolute positions, respectively.

7. The signal processing apparatus according to claim 1, wherein the signal processor:
uses, as the first input apparatus and the first output apparatus, an input apparatus and an output apparatus that have a variable relative positional relationship, respectively, and
uses, as the second input apparatus and the second output apparatus, an input apparatus and an output apparatus that have a fixed relative positional relationship, respectively.

8. The signal processing apparatus according to claim 1, wherein the signal processor uses, as the first input apparatus and the first output apparatus, a plurality of input apparatuses and a plurality of output apparatuses, respectively, the first noise-cancellation target location including a plurality of first noise-cancellation target points corresponding to the plurality of input apparatuses of the first input apparatus.

9. The signal processing apparatus according to claim 1, wherein the signal processor uses an output apparatus for music reproduction, as the first output apparatus.

10. The signal processing apparatus according to claim 1, wherein the signal processor uses, as the second input apparatus and the second output apparatus, an input apparatus and an output apparatus, respectively, that are provided on one component among one or more components forming a seat.

11. The signal processing apparatus according to claim 1, further comprising
a mode setter configured to set an operation mode of the signal processor,
wherein the signal processor switches at least any of an input apparatus used as the first input apparatus, an input apparatus used as the second input apparatus, an output apparatus used as the first output apparatus, or an output apparatus used as the second output apparatus, in accordance with the operation mode set by the mode setter.

12. The signal processing apparatus according to claim 11, wherein the mode setter sets the operation mode in accordance with a presence or an absence of an output of a signal other than the first noise reduction signal or the second noise reduction signal from an output apparatus that can be used as the first output apparatus.

13. A signal-processing method executed by a processor, the method comprising:
generating a first noise reduction signal using an adaptive filter on a basis of a signal output from a first input apparatus, and causing the generated first noise reduction signal to be output by a first output apparatus, the first input apparatus being located at a first noise-cancellation target location in an environment, and the generated first noise reduction signal being output to the environment by the first output apparatus; and
generating a second noise reduction signal using a feedback filter on a basis of a signal output from a second input apparatus, and causing the generated second noise reduction signal to be output by a second output apparatus, the feedback filter having a fixed feedback coefficient, the second input apparatus being located at a second noise-cancellation target location in the environment different from the first noise-cancellation target location, and the generated second noise reduction signal being output to the environment by the second output apparatus.

14. A non-transitory computer-readable recording medium having a program recorded thereon that, when executed by a computer processor, causes the computer processor to perform a signal-processing method, the method comprising:
generating a first noise reduction signal using an adaptive filter on a basis of a signal output from a first input apparatus, and cause the generated first noise reduction signal to be output by a first output apparatus, the first input apparatus being located at a first noise-cancellation target location in an environment, and the generated first noise reduction signal being output to the environment by the first output apparatus, and
generating a second noise reduction signal using a feedback filter on a basis of a signal output from a second input apparatus, and cause the generated second noise reduction signal to be output by a second output apparatus, the feedback filter having a fixed feedback coefficient, the second input apparatus being located at a second noise-cancellation target location in the environment different from the first noise-cancellation target location, and the generated second noise reduction signal being output to the environment by the second output apparatus.

* * * * *